(12) United States Patent
Whitaker et al.

(10) Patent No.: US 11,110,397 B2
(45) Date of Patent: Sep. 7, 2021

(54) DEVICE AND METHOD FOR WATER PRIMING MICROPOROUS-CARBON WATER FILTERS USING NEGATIVE PRESSURE

(71) Applicant: Pure Berkey, L.L.C., Golden Valley, MN (US)

(72) Inventors: John Davis Whitaker, Golden Valley, MN (US); Kelly Murphy Whitaker, Golden Valley, MN (US)

(73) Assignee: Pure Berkey, LLC, Golden Valley, MN (US)

( * ) Notice: Subject to any disclaimer, the term of this patent is extended or adjusted under 35 U.S.C. 154(b) by 272 days.

(21) Appl. No.: 16/035,554

(22) Filed: Jul. 13, 2018

(65) Prior Publication Data

US 2019/0366270 A1    Dec. 5, 2019

Related U.S. Application Data

(60) Provisional application No. 62/668,386, filed on Jun. 4, 2018.

(51) Int. Cl.
*B01D 61/10* (2006.01)
*B01D 24/00* (2006.01)
(Continued)

(52) U.S. Cl.
CPC .............. *B01D 61/10* (2013.01); *B01D 23/24* (2013.01); *B01D 39/2055* (2013.01);
(Continued)

(58) Field of Classification Search
None
See application file for complete search history.

(56) References Cited

U.S. PATENT DOCUMENTS 398,162 A * 2/1889 Keane ............................. 222/81
2,183,877 A * 12/1939 Wilkinson ............. B01D 27/02
210/435

(Continued)

FOREIGN PATENT DOCUMENTS

| DE | 3020615 | 12/1980 | |
|---|---|---|---|
| EP | 0366539 B1 | 3/1998 | |
| WO | WO-2010120754 A2 * | 10/2010 | ............. B01D 29/41 |

*Primary Examiner* — Robert J Popovics
(74) *Attorney, Agent, or Firm* — Charles A. Lemaire; Jonathan M. Rixen; Lemaire Patent Law Firm, P.L.L.C.

(57) ABSTRACT

A method and system for water-priming carbon micropore filter media using negative pressure. The method includes placing dry filter elements in a polymer bag, applying a vacuum of no more than approximately 33 kPa above zero pressure, and heat-sealing the bag using a heat-set bar; submerging, by a consumer, the vacuum-sealed bag with its the filter elements in water; the filters in the vacuum sealed bag are at least partially submerged, puncturing the bag to form one or more small openings in the bag below the water line. Breeching the vacuum causes the water to flow through the openings into the bag and the filter(s) to equalize the pressure between the water and the previously vacuum environment of the plastic bag, causing the surrounding water to quickly flow into the micro-pores of the filter media, thereby priming the carbon filter for use in the gravity-fed water-purification system.

17 Claims, 14 Drawing Sheets

(51) Int. Cl.
  *B01D 39/20* (2006.01)
  *C02F 1/44* (2006.01)
  *C02F 1/00* (2006.01)

(52) U.S. Cl.
  CPC .............. *C02F 1/003* (2013.01); *C02F 1/442* (2013.01); *B01D 2201/081* (2013.01); *B01D 2201/204* (2013.01); *C02F 2303/16* (2013.01)

(56) References Cited

U.S. PATENT DOCUMENTS

| | | | | |
|---|---|---|---|---|
| 2,925,199 | A * | 2/1960 | Brookshier | B65D 5/60 222/91 |
| 3,701,433 | A * | 10/1972 | Krakauer | B01D 36/02 210/436 |
| 3,765,536 | A * | 10/1973 | Rosenberg | B01D 39/2017 210/446 |
| 3,770,625 | A | 11/1973 | Wallis et al. | |
| 4,177,529 | A * | 12/1979 | Sikula, Jr. | B01D 27/00 141/330 |
| 4,266,692 | A * | 5/1981 | Clark | B65B 61/18 215/355 |
| 4,295,563 | A * | 10/1981 | Becker | A22C 13/023 206/205 |
| 4,576,929 | A | 3/1986 | Shimazaki | |
| 4,601,410 | A * | 7/1986 | Bond | B67D 1/0835 222/92 |
| 4,603,793 | A * | 8/1986 | Stern | B65D 77/065 222/105 |
| 4,727,705 | A * | 3/1988 | Zahka | B65D 81/22 206/205 |
| 4,828,698 | A | 5/1989 | Jewell et al. | |
| 4,859,386 | A * | 8/1989 | VanderBilt | B01D 39/2055 264/113 |
| 4,882,051 | A * | 11/1989 | Itoh | B01D 29/216 210/248 |
| 4,893,731 | A * | 1/1990 | Richter | B65D 77/065 222/105 |
| 5,299,714 | A * | 4/1994 | Kilgore | B67B 7/26 222/192 |
| 5,325,995 | A * | 7/1994 | Harrison | B67B 7/26 222/81 |
| 5,368,157 | A * | 11/1994 | Gasparrini | B41F 35/00 206/209 |
| 5,390,823 | A * | 2/1995 | Kilgore | B25B 27/0042 137/318 |
| 5,405,177 | A * | 4/1995 | Goldstein | B01D 46/008 294/210 |
| 5,476,154 | A * | 12/1995 | Sage | F01M 11/0458 141/65 |
| 5,546,979 | A * | 8/1996 | Clark, II | B09B 3/0058 123/196 A |
| 5,598,951 | A * | 2/1997 | DeBano, Jr. | B67B 7/26 222/108 |
| 5,607,595 | A | 3/1997 | Hiasa et al. | |
| 5,645,913 | A * | 7/1997 | Rogers | B65D 65/40 426/106 |
| 5,647,511 | A * | 7/1997 | Bond | B67D 1/0804 222/105 |
| 5,704,383 | A * | 1/1998 | Kammeraad | B09B 3/0058 123/196 A |
| 5,705,269 | A | 1/1998 | Pimenov et al. | |
| 5,762,797 | A | 6/1998 | Patrick et al. | |
| RE35,976 | E * | 12/1998 | Gasparrini | B65D 85/672 206/209 |
| 5,855,223 | A * | 1/1999 | Halonen | B65D 75/5877 137/318 |
| 5,855,298 | A * | 1/1999 | Teetsel, III | B67B 7/26 222/81 |
| 5,915,596 | A * | 6/1999 | Credle, Jr. | B65D 77/065 222/105 |
| 5,928,516 | A * | 7/1999 | Hopkins | B65B 55/22 210/636 |
| 5,941,421 | A * | 8/1999 | Overman | B65D 77/06 222/105 |
| 5,957,584 | A * | 9/1999 | Lakey | B65D 75/5883 383/5 |
| 5,997,613 | A * | 12/1999 | Kaneko | D01F 9/145 95/117 |
| 6,045,006 | A * | 4/2000 | Frazier | B65D 77/065 222/105 |
| 6,056,874 | A * | 5/2000 | Goodman | F16N 31/002 137/312 |
| 6,102,252 | A * | 8/2000 | Overman | B65D 75/5877 222/105 |
| 6,174,439 | B1 * | 1/2001 | Hopkins | B65B 55/22 210/493.1 |
| 6,199,578 | B1 * | 3/2001 | Clark, II | F16N 33/00 123/196 A |
| 6,223,940 | B1 * | 5/2001 | Quinn | B65D 75/5877 222/81 |
| 6,248,237 | B1 * | 6/2001 | Mery | B01D 46/0005 210/234 |
| 6,338,798 | B2 * | 1/2002 | Hopkins | B65B 55/22 210/321.86 |
| 6,368,504 | B1 * | 4/2002 | Kuennen | B01D 39/1623 210/315 |
| 6,423,226 | B1 * | 7/2002 | Hopkins | B65B 55/22 210/321.86 |
| 6,524,477 | B1 | 2/2003 | Hughes | |
| 6,852,224 | B2 * | 2/2005 | Jagtoyen | B01D 39/2062 210/502.1 |
| 7,004,209 | B2 * | 2/2006 | Davis | B65D 75/5877 141/114 |
| 7,081,201 | B2 * | 7/2006 | Bassett | B01D 27/06 210/315 |
| 7,132,048 | B2 * | 11/2006 | Hagashihara | B01D 29/96 210/232 |
| 7,165,700 | B2 * | 1/2007 | Macler | B67B 7/28 222/105 |
| 7,188,749 | B2 * | 3/2007 | Miller | B65D 11/18 222/1 |
| 7,846,330 | B2 * | 12/2010 | Nelson | B01D 27/08 210/233 |
| 8,127,784 | B2 * | 3/2012 | Cesarz | B67B 7/24 137/15.13 |
| 8,496,020 | B1 * | 7/2013 | Westerberg | F01M 11/0408 137/15.14 |
| 9,616,362 | B2 * | 4/2017 | Johnson | B01D 29/41 |
| 9,675,914 | B2 * | 6/2017 | Rivera | B01D 29/96 |
| 9,994,465 | B2 * | 6/2018 | Epstein | C02F 1/68 |
| 10,138,773 | B2 * | 11/2018 | Dosky | B67B 7/24 |
| 10,555,872 | B1 * | 2/2020 | Thorne | A61J 1/2096 |
| 10,589,199 | B2 * | 3/2020 | See | C02F 1/001 |
| 10,800,556 | B2 * | 10/2020 | Thorne | A61J 1/2086 |
| 10,905,976 | B2 * | 2/2021 | Johnson | B01D 21/307 |
| 2001/0000893 | A1 * | 5/2001 | Hopkins | B65D 81/22 210/348 |
| 2002/0060179 | A1 * | 5/2002 | Hopkins | B65B 55/22 210/244 |
| 2003/0136728 | A1 * | 7/2003 | Jagtoyen | B01D 39/2065 210/502.1 |
| 2004/0094467 | A1 * | 5/2004 | Diemer | B01D 35/143 210/347 |
| 2005/0121464 | A1 * | 6/2005 | Miller | B67D 3/04 222/81 |
| 2006/0011534 | A1 * | 1/2006 | Hagashihara | B01D 29/96 210/232 |
| 2007/0221585 | A1 * | 9/2007 | Vozar | B01D 46/24 210/767 |
| 2008/0142543 | A1 * | 6/2008 | Jones | B67B 7/26 222/81 |
| 2010/0130918 | A1 * | 5/2010 | Elahi | A61M 39/18 604/29 |
| 2010/0264100 | A1 * | 10/2010 | Rivera | B01D 29/96 210/808 |
| 2011/0303589 | A1 * | 12/2011 | Kuennen | C02F 1/281 210/95 |

(56) References Cited

U.S. PATENT DOCUMENTS

| | | | |
|---|---|---|---|
| 2013/0186841 A1* | 7/2013 | Johnson | B01D 35/30 210/767 |
| 2015/0129510 A1* | 5/2015 | Johnson | B01D 36/001 210/767 |
| 2015/0329263 A1* | 11/2015 | Wong | B01D 29/016 206/205 |
| 2017/0080367 A1* | 3/2017 | Johnson | B01D 35/30 |
| 2017/0296952 A1* | 10/2017 | Wong | B65D 81/22 |
| 2018/0021695 A1 | 1/2018 | Ash et al. | |
| 2018/0154290 A1* | 6/2018 | See | B01D 39/163 |
| 2018/0280838 A1* | 10/2018 | Johnson | C02F 1/001 |
| 2019/0366270 A1* | 12/2019 | Whitaker | C02F 1/003 |
| 2020/0130873 A1* | 4/2020 | Thorne | B65B 3/003 |
| 2020/0215463 A1* | 7/2020 | Johnson | C02F 9/005 |
| 2020/0337946 A1* | 10/2020 | Thorne | A61J 1/16 |

\* cited by examiner

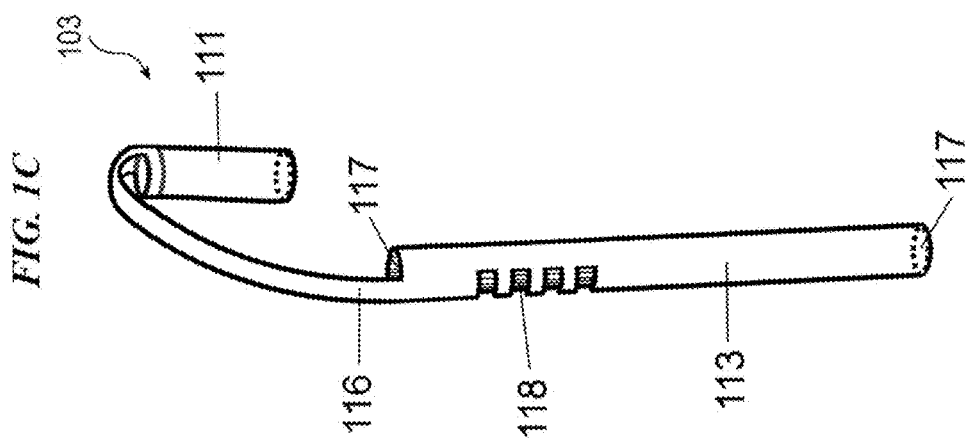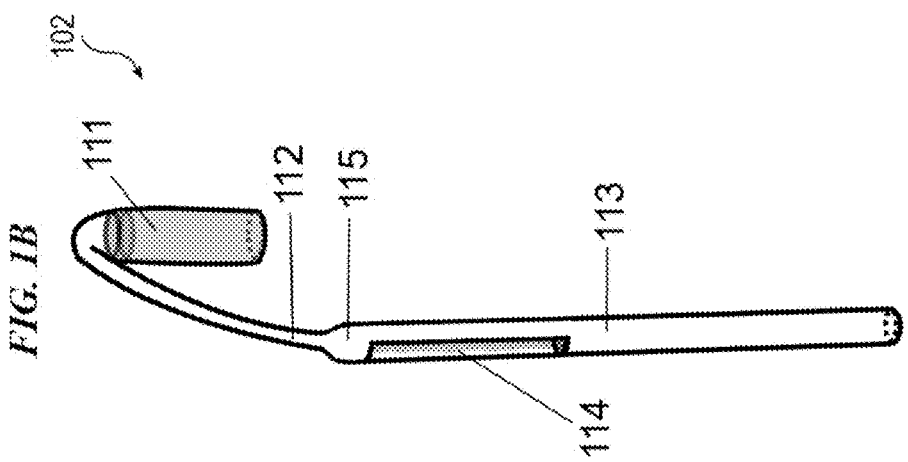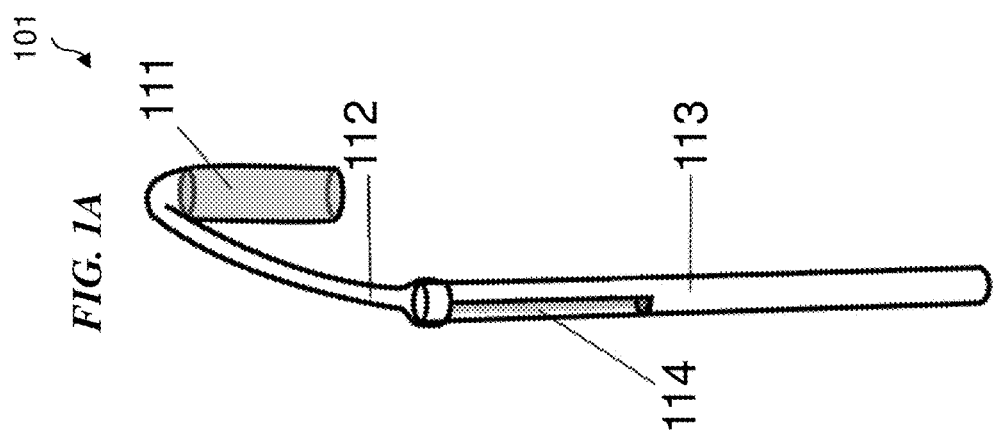

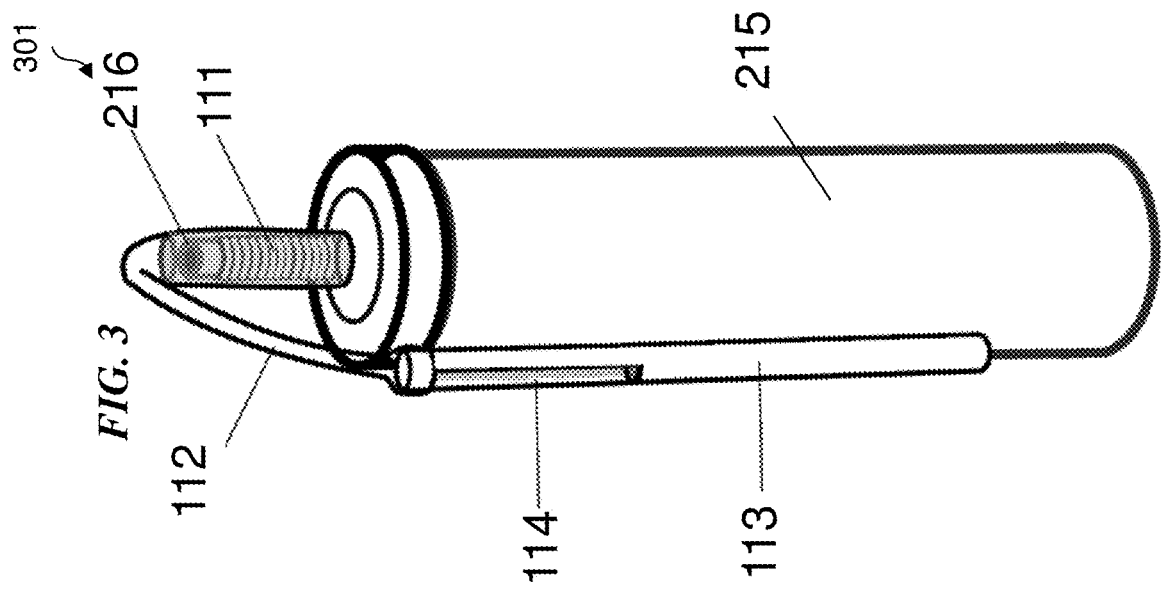
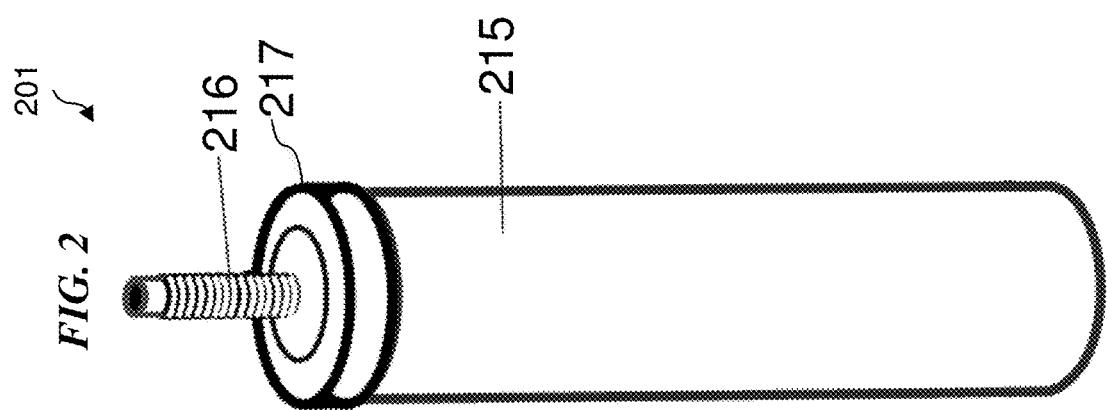

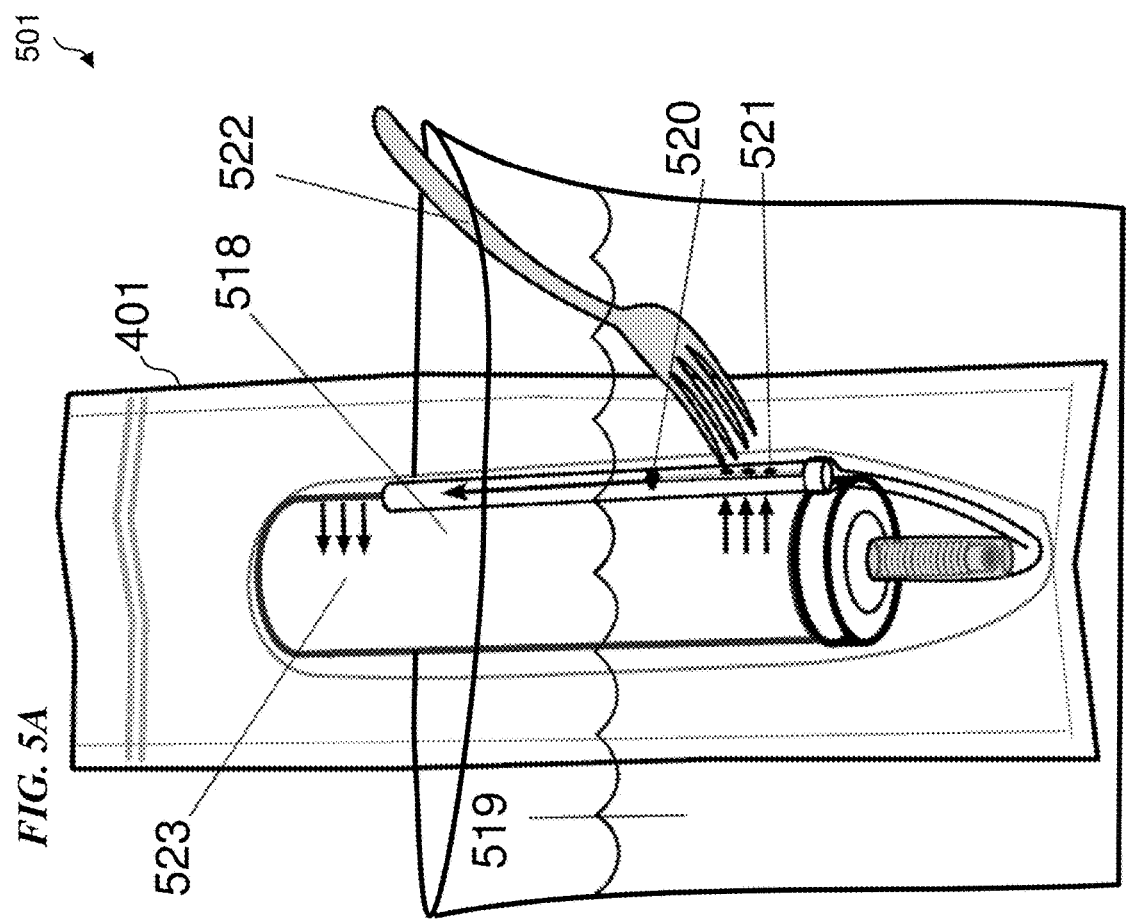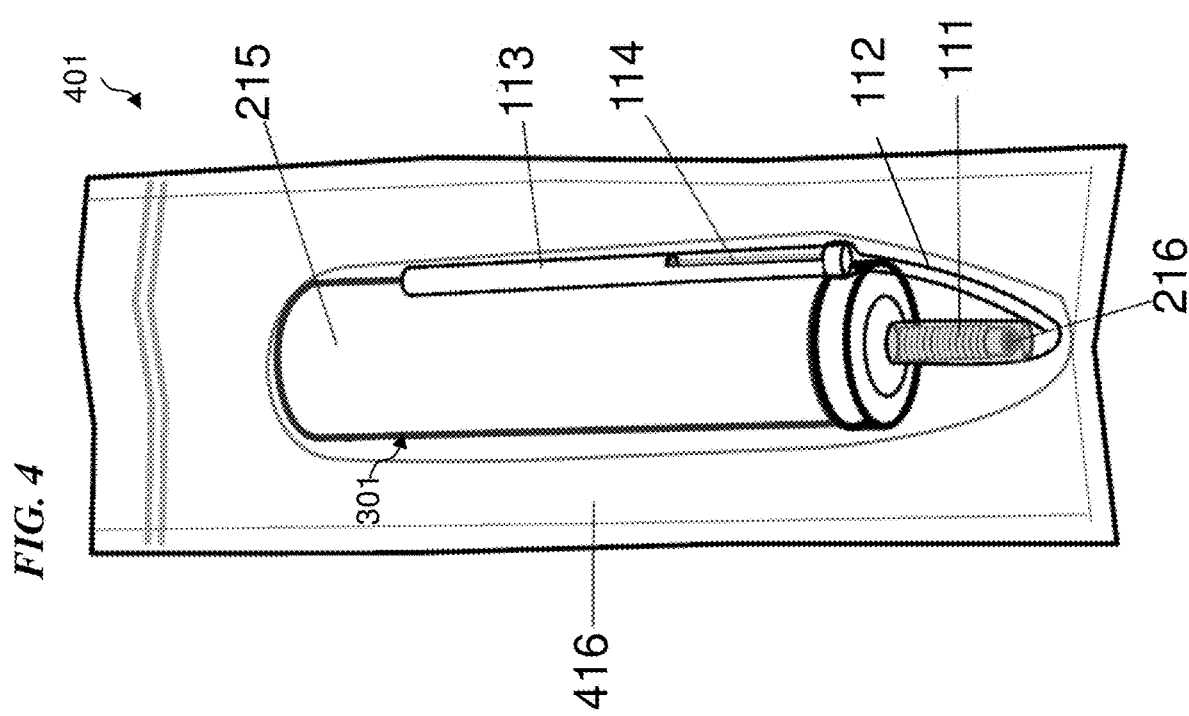

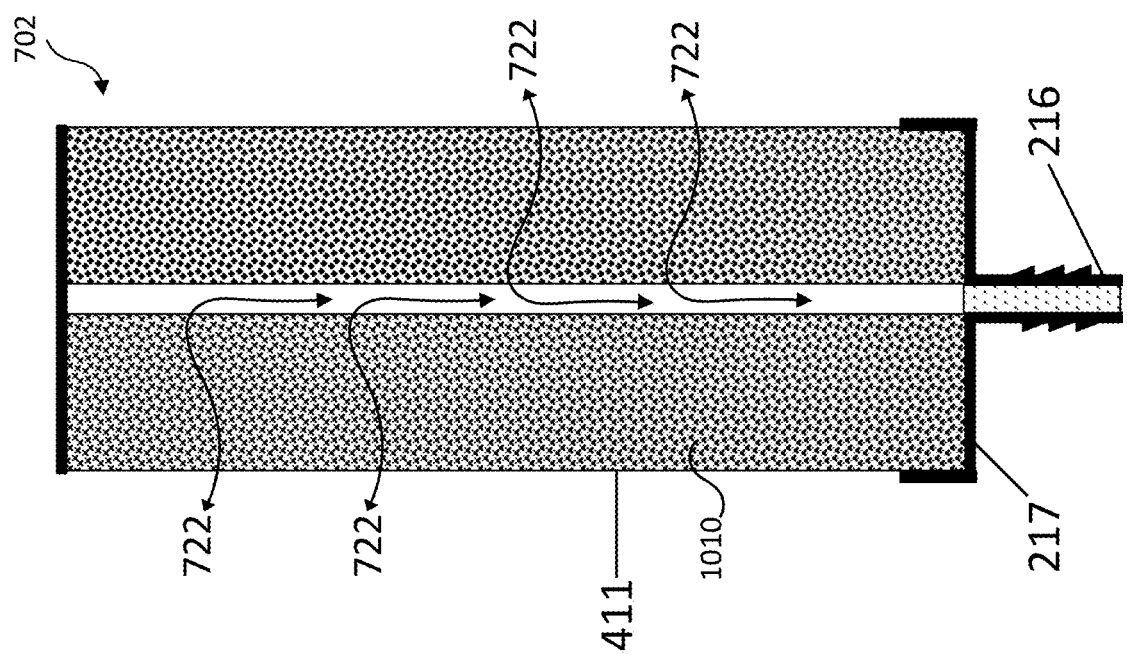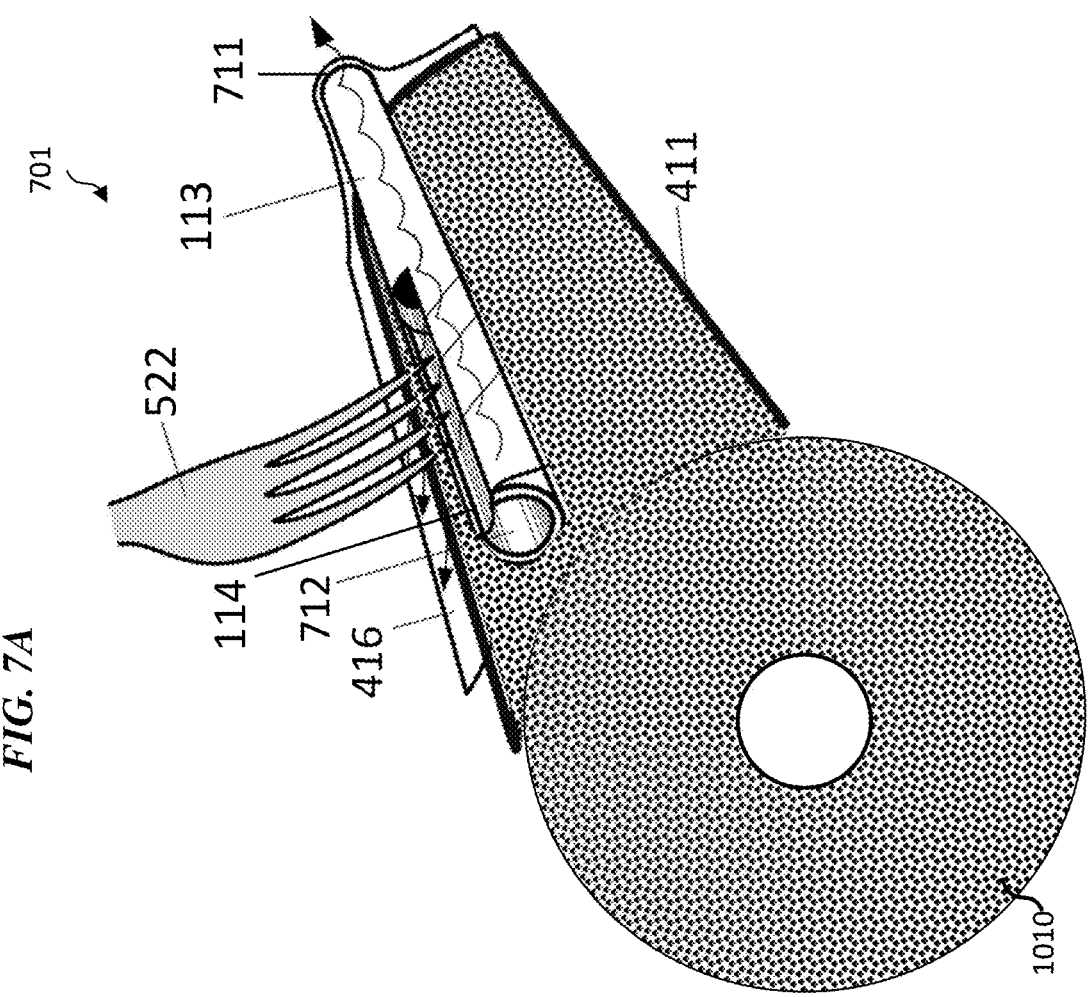

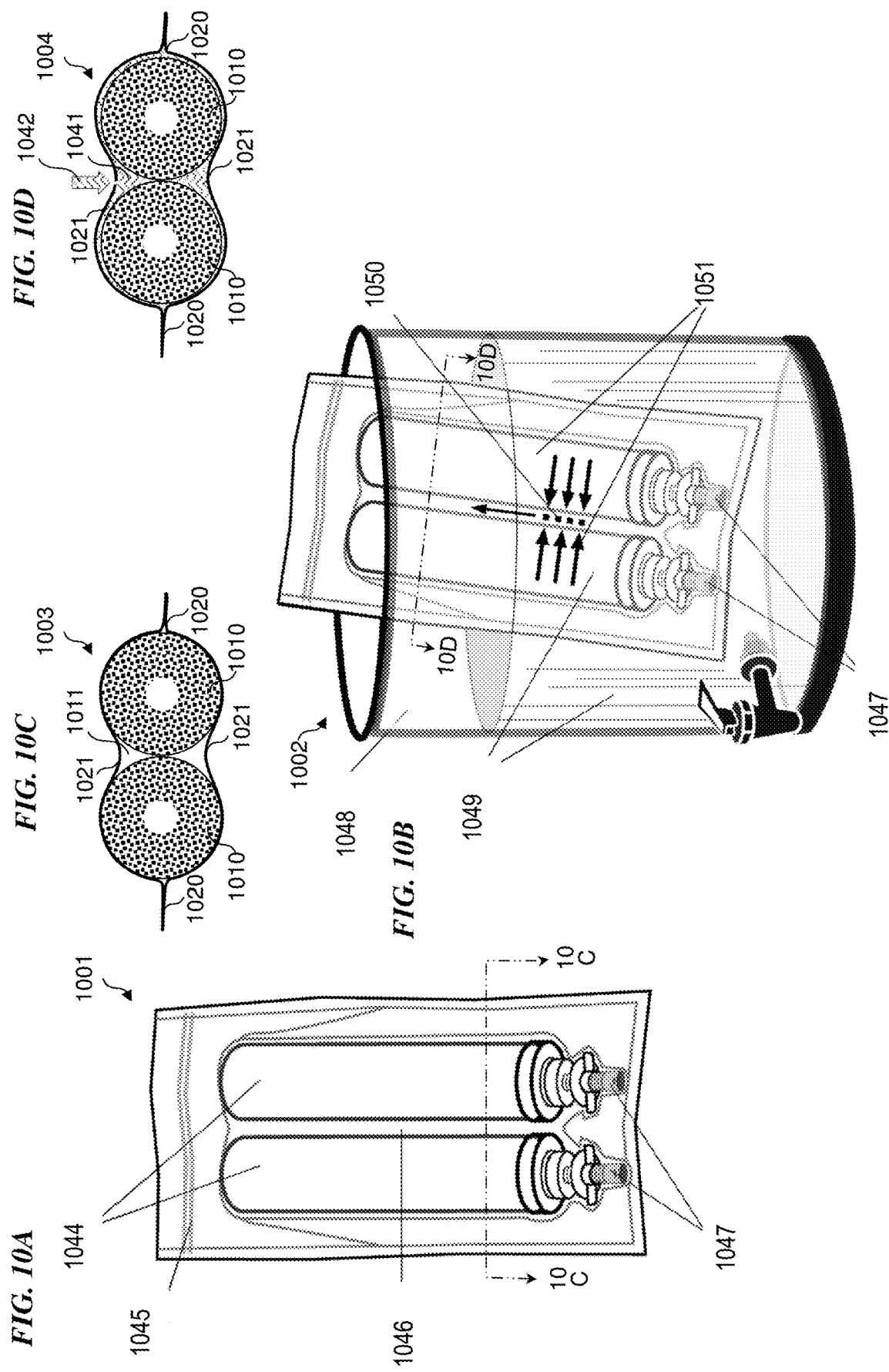

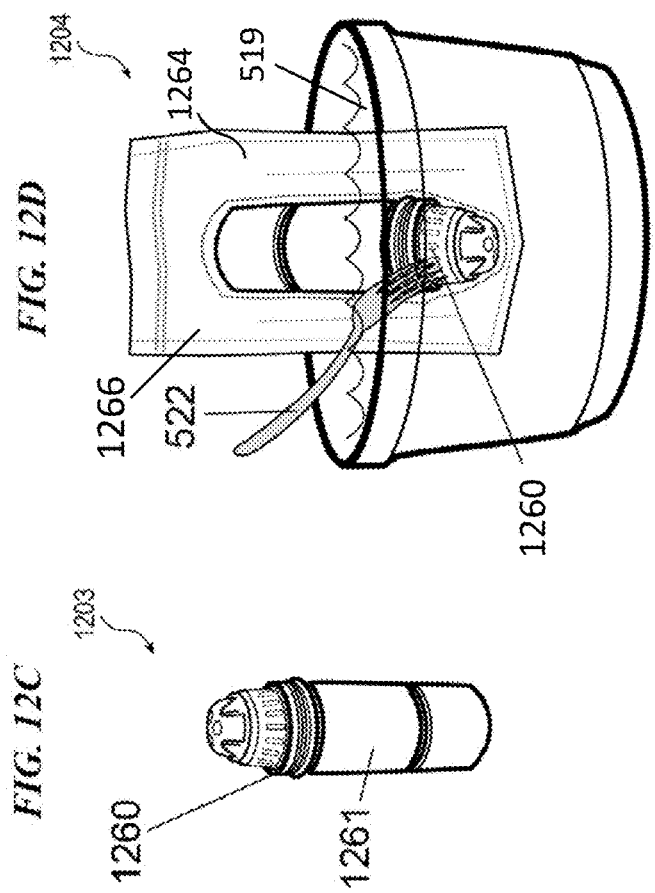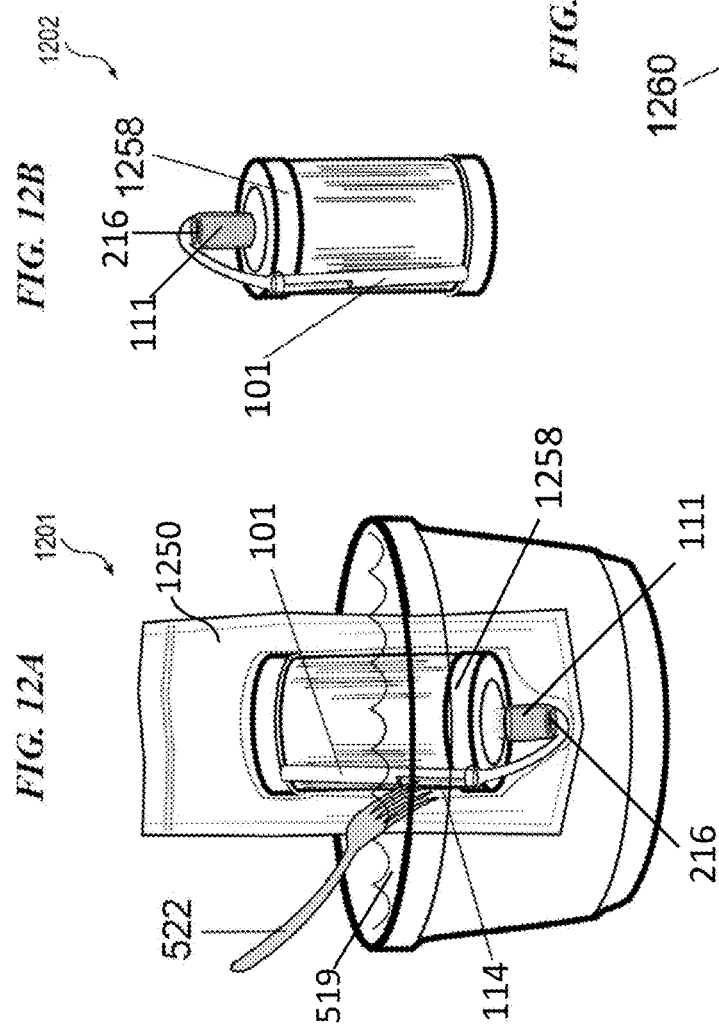

DEVICE AND METHOD FOR WATER PRIMING MICROPOROUS-CARBON WATER FILTERS USING NEGATIVE PRESSURE

CROSS-REFERENCE TO RELATED APPLICATION

This application claims priority benefit, under 35 U.S.C. § 119(e), of U.S. Provisional Patent Application 62/668,386, filed Jun. 4, 2018 by John Davis Whitaker, titled "Method for Water Priming Carbon Microporous Gravity Filter Elements Using Negative Pressure," which is incorporated herein by reference in its entirety.

FIELD OF THE INVENTION

This invention relates to the field of water-filtration devices, and more specifically, to a method, kit and device for end-user preparation of water filters for use, particularly filters that are dry when delivered and that include microporous carbon granules. While the invention may be used in many types of water-filtration devices, it is especially suited for use in gravity-assisted water-flow systems and will be described in that connection.

BACKGROUND OF THE INVENTION

Countertop gravity water filtration systems provide a portable, economical and highly effective way to remove contaminants from water at point of use. Such systems provide ready access to purified or filtered water in a variety of applications including field emergencies and home use, and are gaining popularity in home use applications as public trust in the purity of their tap water has eroded. Increasingly, retail consumers are seeking to protect themselves from contaminants or levels of contaminants that municipal water treatment systems cannot or do not address or monitor due to a perceived or real lack of action on the part of government. Many consumers are looking for an added level of protection from contaminants in the water that comes out of their faucets. Many of these contaminates, including harmful chemicals, such as lead and PFASs, hexavalent chromium, pharmaceuticals, herbicides, insecticides, the toxic byproducts of disinfection such as Total trihalomethanes, halocetic acids, and microbiological organisms such as bacteria, parasites, protozoa and viruses, are not consistently removed or reduced effectively from drinking water. Additionally, nearly 30% of Americans get their water from untreated private wells which are commonly contaminated with bacteria, arsenic and other naturally occurring but hazardous materials. The use of recycled municipal grey water is anticipated to rise in coming years; this along with increasingly contaminated source water from rivers, lakes and aquifers creates multiple, likely scenarios where the increasing load of toxic disinfection chemicals required to meet municipal water system treatment requirements for this heavily contaminated source water results in poor quality water necessitating point-of-use filtration to produce drinking water of acceptable quality.

The retail water-filtration customer is looking for filtration systems that are easy to use and set up and that provide adequate clean water in a timely manner with minimal complications. Unfortunately, many common filtration systems on the market require time-consuming and often confusing steps to start up. Customers who are unfamiliar with preparing microporous filtration elements for regular use may have a difficult time getting the best performance and full flow-rate capability from these filtration elements and may be required to wait as many as 48 hours to achieve full operation.

The U.S. Environmental Protection Administration has taught against the use of activated carbon alone for pathogen removal, stating that "activated carbon [even] with silver does not eliminate all bacteria in water and cannot remove protozoa and viruses." (See 59 Federal Register 223, Nov. 21, 1994.) As an example of the use of separate pathogen removal means, U.S. Pat. No. 4,828,698 (Jewell et al., issued May 9, 1989) teaches the use of a microporous membrane having pore sizes from 0.02 μm to 0.5 μm for microbiological control. U.S. Pat. No. 4,576,929 (Shimazaki, issued Mar. 18, 1986); U.S. Pat. No. 5,705,269 (Pimenov et al., issued Jan. 6, 1998); and U.S. Pat. No. 5,607,595 (Hiasa et al., issued Mar. 4, 1997) teach the use of silver, organic pesticides, and periodic heating to supplement activated carbon use. U.S. Pat. No. 3,770,625 (Wallis et al., issued Nov. 6, 1973) teaches that viruses can be removed from a liquid using activated carbon forms (granular, powdered or pelleted) treated with a sodium containing hydrolyzing composition, such as sodium hydroxide, after an acid wash. The '625 patent further teaches that the method did not provide stand-alone treatment stating "it is frequently desirable to have filtration downstream of the activated charcoal to remove any sluffed-off adsorbing medium." U.S. Pat. No. 5,762,797 (Patrick et al., issued Jun. 9, 1998) discloses the use of a separate nonwoven, which is treated with an antibacterial material, to effect treatment of the bacteria. German Patent Publication No. 3,020,615 (Beauman et al., published Dec. 11, 1980) discloses the addition of silver-containing compounds to effect antibacterial activity. More recently, activated carbon fibers have been employed in water purification/filtration devices. See, e.g., U.S. Pat. No. 4,576,929 (Shimazaki, issued Mar. 18, 1986), U.S. Pat. No. 5,705,269 (Pimenov et al., issued Jan. 6, 1998), and European Patent EP366,539B1 (Kaneko, et al., published Mar. 25 1998). While these and other prior art references have previously utilized activated carbon, including activated carbon fibers, in water filters, it is evident that the activated carbon is being employed to remove organic matter.

Existing methods for use by end users for preparing filters commonly sold for household use are generally categorized within three general methods to achieve acceptable flow rates:
  forcing air out and water into the micro-pores by a high-pressure reverse flow of unfiltered water into the filter outlet port, which introduces contaminated water to the inside of the filters;
  soaking the filter from 15 minutes to 36 hours; and/or
  flushing the filter from 15 seconds to 10 minutes. These methods are time consuming, water-wasting, frequently messy and create uncertainty as to whether the filters are effectively prepared for use—a top end-user complaint.

U.S. Pat. No. 6,524,477 to Hughes issued on Feb. 25, 2003 with the title "Gravity-flow filtration cartridge for the removal of microorganisms and/or other contaminants," and is incorporated herein by reference. U.S. Pat. No. 6,524,477 describes gravity-flow filter cartridges for removing waterborne parasites, and other contaminants such as chlorine, lead, and organics from water. The filtration cartridge includes a liquid porous plastic filter, which has pore diameters large enough to let water pass at acceptable flow rates under only the force of gravity, while the matrix creates a tortuous path which traps parasites and other microorganisms that are typically in the approximately 3- to 9-micron size range. U.S. Pat. No. 6,524,477 describes that in order to prime the preferred filtration cartridge, a special pre-wetting step is required. The pre-wetting step involves the removal of air in a vacuum and then introducing water to fill the part completely with liquid. In large scale production, the parts would be placed in a vacuum chamber and after drawing out the air, water would be introduced so as to more effectively wet the parts. Surface tension cannot be overcome without removing the air the first time. However, there is no description nor suggestion of how to deliver a dry filter cartridge to an end user and have the end user hygienically and safely prime the cartridge using water that is potentially contaminated.

U.S. Patent Publication 2018/0021695 by Ash et al. published on Jan. 25, 2018 with the title "Carbon Block/Filtration Bed/Conical Reactor with Fluidized Bed System Allowing Small Sorbent Particles to Regenerate Fluid During Extracorporeal Blood Treatment," and is incorporated herein by reference. Publication 2018/0021695 describes methods and devices for powdered sorbent regeneration of biologic fluids are disclosed. Three methods are described, which may be used singly or in any combination, for constraining or immobilizing powders so that they can be perfused with a biological fluid or dialysate: a porous carbon block filter, a filtration bed of very fine powder, and a cone-shaped reactor. Publication 2018/0021695 describes priming a reactor (e.g., a carbon block) to exclude harmful air and permit rapid and easy insertion of such a reactor into an existing (dialysis) treatment system by evacuating the reactor to a high vacuum. When the user fills the reactor from a standard IV bag, the reactor is immediately ready to use without otherwise difficult to remove entrained air. However, again there is no description nor suggestion of how to deliver a dry filter cartridge to an end user and have the end user hygienically and safely prime the cartridge, nor of using the carbon block for filtering water.

There remains a need in the art for a method and lightweight delivery container for carbon micropore filters such that the filters are delivered dry (for lower weight and less-costly shipping), then when needed, are easily and hygienically "primed" (filters that can be filled, via only the unfiltered entry port, with water that wets the carbon granules and replaces substantially all the air inside the micropores with water).

SUMMARY OF THE INVENTION

The system and method of the present invention, described herein, simply and easily prepares filters in a highly efficient manner, uses little water, requires no additional water pressure or special tools and effectively prepares the filter to achieve optimal flow rates.

In some embodiments, the present invention provides a device and method for ease of customer use in quickly and effectively introducing water into micro-pore gravity-flow water filter media using the negative pressure present within the vacuum bag thereby preparing it for use. This simplifies the process of preparing filters for use in a water purification or filtration system. In some instances, the existing clean water capture vessel (chamber, pitcher, etc.) included with the various water filtration devices may be filled to provide adequate water for filter preparation, further simplifying the process. However, the device and method disclosed functions in any circumstance where the filters prepared using the present device and method can be at least partially submerged in fresh (e.g., non-salt) water that meets the filter manufacturer's requirements and the filter's contaminant-removal capabilities. In addition, this method of priming the filters does not require high water pressure from a faucet. This allows for preparation of filters in the field, in so called "off-grid" environments, or in the event of a water-main break or other emergency where water pressure is not available. In some embodiments, the activation of the preparation method requires the (at least partial) submersion of the vacuum-sealed bag and the filters contained within it, and the introduction of a few (e.g., in some embodiments, one to 4) small openings—such as those made by puncturing the bag with a common household dinner fork, writing pen, pin or stick—in the bag wall at the device's target area. When the bag is breached in this manner, the surrounding water relatively rapidly flows (as controlled by the puncture size and/or restrictions in the device that facilitates puncture and water entry) into a channel in the bag and into the filter media as the pressure seeks to equalize in the surrounding water. Vacuum packaging purges air (which would form bubbles) from the filter media. Introducing small punctures in the bag while the bag is at least partially submerged in water causes water to fully infiltrate the filter media very quickly (typically less than 30 seconds), optimally preparing the filters for use. This device and method of preparing filters for use eliminates the need for additional or specialty tools, or specific circumstances such as access to appropriate plumbing to achieve the desired outcome. In addition, the vacuum packing bag provides a layer of protection during storage and transit, where the filter media may be exposed to strong odors that may be absorbed, or water damage. The method and device's use of only a small hole may reduce the need to pre-filter or strain water to remove larger particles such as leaves, sand, dirt, etc., which may be present in source water in field or emergency applications and which can prematurely clog filters. As a result, successful filter preparation may now occur in any circumstance where water volume is sufficient to cover the filters exists, and is of the quality required by the filter manufacturer, improving speed and overall access to filter use in emergency, field and off grid environments domestically and internationally.

The system and method described here fully utilizes the natural attributes and actions of the filter media to quickly and completely prepare the filter in a highly efficient and effective manner.

BRIEF DESCRIPTION OF THE FIGURES

FIG. 1A is a perspective view of a combined infiltration barrier, connector, and water-entry puncture-target apparatus 101 according to some embodiments of the present invention.

FIG. 1B is a perspective view of a combined infiltration barrier, connector, and water-entry puncture-target apparatus 102 according to some embodiments of the present invention.

FIG. 1C is a perspective view of a combined infiltration barrier, connector, and water-entry puncture-target apparatus 102 according to some embodiments of the present invention.

FIG. 2 is a perspective view of a water filter 201, according to some embodiments of the present invention.

FIG. 3 is a perspective view of water filter, barrier, and puncture target assembly 301 that includes water filter 201 connected to combined infiltration barrier, connector, and water-entry apparatus 101, according to some embodiments of the present invention.

FIG. 4 is a perspective view of assembled shippable assembly 401 that includes assembly 301 vacuum sealed in bag 416, according to some embodiments of the present invention.

FIG. 5A is a perspective view of a method 501 during which assembled shippable assembly 401 is at least partially submersed in water 519, according to some embodiments of the present invention.

FIG. 7A is a close-up perspective view, partially in cross-section, of a method 701 during which the polymer bag 416 (of the water-infused and assembled shippable assembly 401) is supported at the edges of elongated opening 711 having a C-shaped cross section, such that a puncturing tool, such as fork 522, can readily poke one or more small holes through the bag 416 to introduce water to the filter media 411, according to some embodiments of the present invention.

FIG. 7B is a longitudinal cross-sectional view of a microporous water filter 702 having a filter portion 411 with cross section of filter media 1010 manufactured with a sealed end cap 217 and a threaded stem outlet 216 (also called exit port 216) extending from the end cap 217, according to some embodiments of the present invention.

FIG. 10A is a perspective view of assembled dual-filter shippable assembly 1001 that includes two filters, each capped with a water-infiltration barrier, packaged in a vacuum-sealed bag 416, according to some embodiments of the present invention.

FIG. 10B is a perspective view of a method 1002 during which water 519 enters at a controlled rate through holes 1050 and then enters the water filter media, according to some embodiments of the present invention.

FIG. 10C is a radial cross-sectional view 1003 (along the dot-dashed line 10C of FIG. 10A) assembled dual-filter shippable assembly 1001 that includes two filters, each capped with a water-infiltration barrier, packaged in a vacuum-sealed bag 416, according to some embodiments of the present invention.

FIG. 10D is a radial cross-sectional view 1004 assembled dual-filter shippable assembly 1001 that includes two filters, each capped with a water-infiltration barrier, packaged in a vacuum-sealed bag 416 during which water 519 enters at a controlled rate and then enters the water filter media 411, according to some embodiments of the present invention.

FIG. 12A is a perspective view of apparatus 1201, according to some embodiments of the present invention, having an alternative water filter 1258 prepared with the water outlet port 216 covered by the water infiltration barrier 111 with the strap connector 112 attached to the water entry apparatus 101. The filter and the apparatus are shown sealed within the vacuum bag 416 and submerged under water 519 in preparation for puncturing the bag with a fork 522.

FIG. 12B is a perspective view of apparatus 1202, according to some embodiments of the present invention, having the water filter prepared with the water outlet port 216 covered by the water infiltration barrier 111 and the strap connector 112 attached to the water entry apparatus 101.

FIG. 12C is a perspective view of apparatus 1203, according to some embodiments of the present invention, having an alternative water filter suitable for end user preparation using the present invention. The water filter inlet ports 1260 provide gaps in the water filters plastic encased water filter media covering 1261.

FIG. 12D is a perspective view of apparatus 1204, according to some embodiments of the present invention, packaged in a vacuum-sealed bag 1266 during which the polymer bag of assembled single-filter shippable assembly 1264 is held under water and punctured by fork 522 to leave one or more small holes at the target water filter inlet ports 1260.

DETAILED DESCRIPTION OF THE INVENTION

Figure 5B:
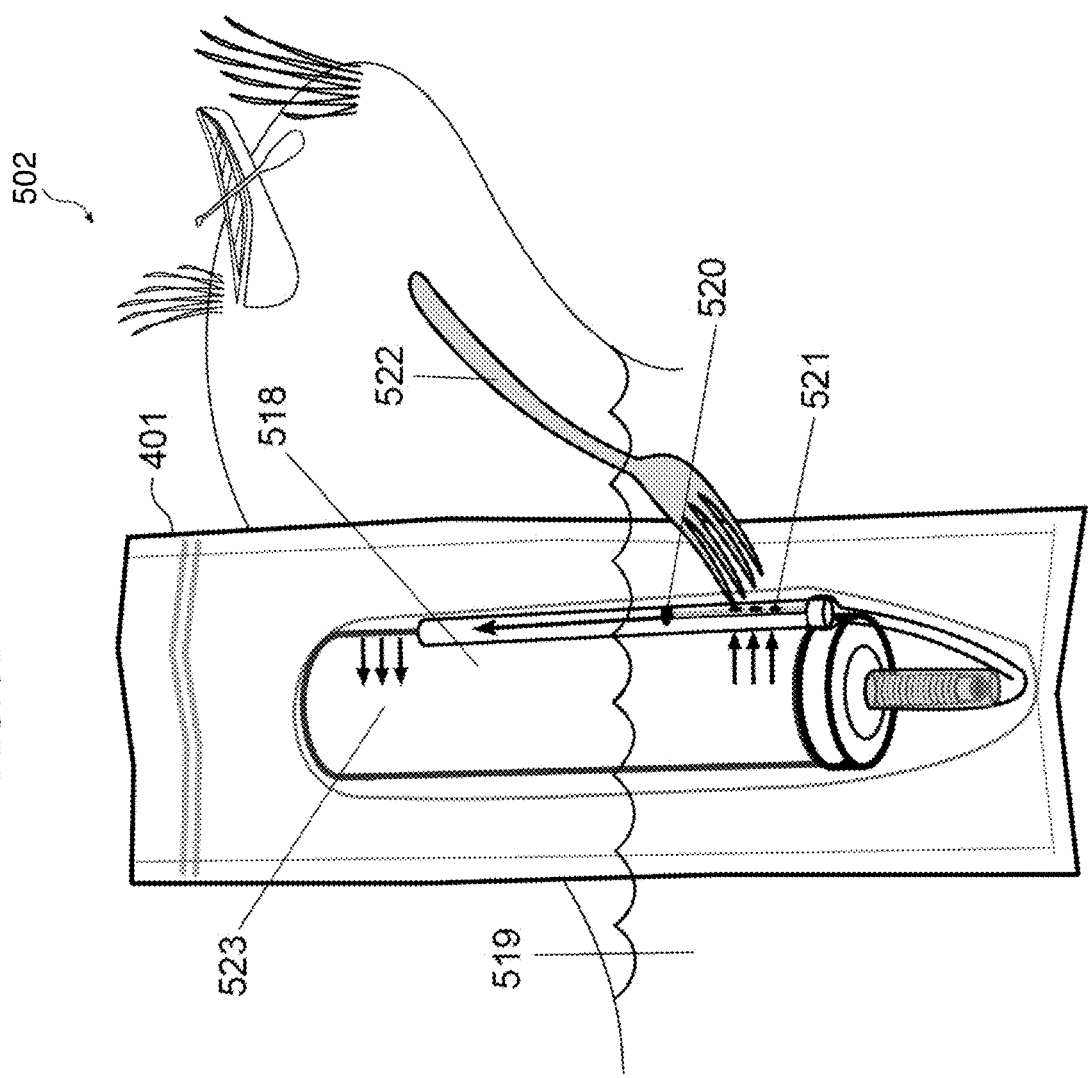
FIG. 5B is a perspective view of a method 502 during which assembled shippable assembly 401 is at least partially submersed in a fresh water 519 pond, lake, river or stream, according to some embodiments of the present invention.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and application publications incorporated by reference in the present application). Further, some embodiments include fewer than all the components described as part of any one of the embodiments described herein.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Certain marks referenced herein may be common-law or registered trademarks of third parties affiliated or unaffiliated with the applicant or the assignee. Use of these marks is for providing an enabling disclosure by way of example and shall not be construed to limit the scope of the claimed subject matter to material associated with such marks.

The disclosed method and device for preparing water filters has embodiment in the process of water priming a wide variety of water filters broadly available for residential use, but future embodiments may extend beyond these systems. These systems are typically but not exclusively utilized in gravity-fed filter systems employing solid block carbon, loose carbon or combinations of both using either external housings or exposed media. Candidate embodiments include any filter media or system that deploys water pressure, soaking in water or water flushing to prepare the filter media for use. The substitution of the disclosed vacuum method and the disclosed device to channel and water dramatically reduces the time and amount of water needed to successfully prepare filters for use, and may allow some filters to achieve maximum gallon per hour performance in excess of current preparation methods.

Disclosed is a method and system for water priming carbon micro-pore gravity filter media using negative pressure to prepare for use in a water purification system. The filters are carbon with micro-pores <0.1 microns in diameter. Under this application, one or more dry filter elements are placed in an appropriate vacuum-packing plastic bag, the bag and filter(s) are placed in a vacuum chamber of a vacuum-packing device.

In some embodiments, the bag is sealed using a heat-set bar, with the vacuum-packing device's gauge reading at approximately −0.1 MPa (equivalent to about −29.5 in. Hg or about −749 torr), with the minus sign indicating values below standard atmospheric pressure of 101.325 kPa (about 0.1013 MPa, which is equivalent to standard atmospheric pressure of about 29.92 in. Hg or 760 torr). Accordingly, the pressure in the bag when that much vacuum is applied by the vacuum-packing device is about 1.3 kPa (equivalent to about 0.42 in. Hg or about 10.7 torr) above absolute zero pressure. In other embodiments, the pressure in the bag is no more than 0.5 kPa, no more than 0.75 kPa, no more than 1 kPa, no more than 1.5 kPa, no more than 2 kPa, no more than 5 kPa, no more than 10 kPa, or no more than 15 kPa, or no more than 20 kPa, or no more than 25 kPa, or no more than 33 kPa. In one preferred embodiment, the pressure in the bag is no more than 5 kPa.

In some embodiments, the heat-sealable vacuum bag is made of a multi-layer poly-nylon film (in some such embodiments, a 9-layer poly-nylon film), and provide moisture transmission rates of less than about 5 $g/m^2/day$ and oxygen transmission rates of less than about 45 $cc/m^2/day$). In some embodiments, the heat-sealable vacuum bag is made of a multi-layer film having four layers, from the inside to outside, of polyolefin, aluminum foil, nylon, and polyester. In some embodiments, the heat-sealable vacuum bag is made of a multi-layer film having three layers, from the inside to outside, of polyolefin, aluminum foil, and polyester.

In some embodiments, after the filter elements are sealed in the heat-sealable vacuum bag, the ensemble is sterilized with conventional food-sterilization techniques, such as using heat (such as from microwaves and/or high-pressure pasteurization techniques) or gamma radiation. In some embodiments, non-foil packaging is used for the heat-sealable vacuum bag in order to be compatible with conventional food-sterilization techniques, such as microwave and high-pressure pasteurization.

The consumer submerges the filter elements in the vacuum sealed bag in water. While the filters in the vacuum sealed bag are completely submerged, a few small openings—such as those made by the puncture of a common household dinner fork, pen tip or even a stick—are made in the bag. Breeching the vacuum bag causes the pressure to push water into the bag to begin to equalize within the previously negative pressure environment of the plastic bag, causing the surrounding water to quickly flow into the micropores of the filter media, thereby priming the carbon filter for use in the gravity water purification system.

The following table provides a cross-reference for reference numbers

| Numeral | Definition |
|---|---|
| 101 | a combined infiltration barrier, connector and water entry apparatus. |
| 111 | Water Infiltration Barrier |
| 112 | Connector/strap |
| 113 | Cylinder |
| 114 | Channel/Puncture Target |
| 201 | FIG. 2- perspective view of a water filter |
| 207 | End cap of cylindrical water filter |
| 215 | Water Filter |
| 216 | Clean Water Exit Port |
| 217 | Water Filter Cap |
| 301 | assembled water filter with connector, and water entry apparatus and water infiltration barrier |
| 401 | assembled, shippable assembly 201 in vacuum sealed bag |
| 411 | Vacuum Bag |
| 416 | Vacuum Bag Surface |
| 501 | a single water filter packaged in a vacuum sealed bag with attached combined infiltration barrier, connector and water entry apparatus submerged under water demonstrating punctures from a fork 522 and subsequent water movement through the apparatus during equalization of pressure |
| 518 | Ensemble Vacuum Packed Water Filter and Apparatus |
| 519 | Water |
| 520 | Water travelling though Cylinder 113 |
| 521 | Water entering Channel 114 |
| 522 | Fork |
| 523 | Infiltration of Water Filter |
| 601 | a method of submerging the vacuum sealed media in fresh water to provide for the efficient introduction of water to the filter media preparing it for use. |
| 602 | a method during which puncture target 114 is removed from water-primed filter assembly 301, according to some embodiments of the present invention. |
| 603 | a method during which infiltration barrier 111 is removed from the end of water-primed filter 201, according to some embodiments of the present invention. |
| 624 | Prepared Water Filter, Vacuum Bag and Apparatus |
| 699 | Scissors |
| 701 | a close perspective view of punctures being introduced by a fork 522 through the polymer bag into the target area of the cylinder 113 and subsequent flow of water over and through cylinder as water is drawn in during pressure equalization |
| 711 | Open end of Cylinder 113 |
| 801 | a perspective view of a dual filter ensemble with one attached combination water infiltration barrier, connector, cylinder and channel device, and one water infiltration barrier and connector/strap |
| 802 | an ensemble vacuum-packed and sealed within the vacuum bag |
| 816 | Ensemble of vacuum bag sealed with dual water filters and one attached combination water infiltration barrier, connector, cylinder and channel device, and one water infiltration barrier and connector/strap |
| 838 | Connector and Water Infiltration Barrier |
| 901 | a perspective view of 802 submerged in water contained in the clean water capture vessel of a gravity water filter system with punctures introduced in the target area |
| 902 | a perspective view of water flowing at a controlled rate through the device from the punctures introduced in the target area in shippable assembly 802 |
| 911 | Clean Water Capture Vessel of a Gravity Water Filter System |
| 912 | Ensemble 802 water filter and apparatus in vacuum sealed package under water |
| 913 | Punctures Created by Fork 522 |
| 914 | Placement of Cylinder 113 and Channel 114 |
| 1001 | assembled dual filter shippable assembly 1001 that includes two filters, each capped with a water-infiltration barrier, packaged in a vacuum-sealed bag 411 |
| 1002 | a method during which water enters at a controlled rate through puncture holes |
| 1003 | ensemble 1001 prior to punctures being introduced to the vacuum sealed bag |
| 1004 | ensemble 1001 after punctures are introduced to the vacuum sealed bag |
| 1010 | Cross section of filter media |
| 1011 | Cross section of channel created by side by side placement of filters in vacuum bag |
| 1020 | Cross section of vacuum bag after vacuum applied |
| 1021 | Cross section of taut surface of vacuum bag created by filter placement after vacuum packing, thereby creating a target area for puncture. |
| 1041 | The water entering the channel created by filter placement within the vacuum bag after packaging. |
| 1042 | Puncturing a vacuum bag in the taut area created on the bag surface by the positioning of dual water filters within the bag |
| 1044 | Ensemble of two water filters |
| 1045 | Heat Sealed Vacuum Bag |
| 1046 | Puncture Target Area |
| 1047 | Water Infiltration Barriers |
| 1048 | Lower chamber of a gravity water purification system utilized to hold water (clean water capture vessel) in which to submerge water filters prepared with the method |
| 1049 | Ensemble dual filters, submerged in water within Clean Water Capture Vessel |
| 1050 | Punctures in Vacuum Sealed Bag draw in surrounding water during pressure equalization, infiltrating filter media and preparing filter for use |
| 1051 | Filter Media |
| 1101 | a combined vacuum sealable bag and water entry puncture target apparatus |
| 1102 | two ceramic water filters and two water infiltration barriers positioned above the clean water ports prior to installation on the clean water ports |
| 1103 | a dual ceramic filter and vacuum sealed bag with integrated cylinder and channel as a shippable assembly |
| 1152 | Vacuum Bag Integrated with Apparatus |
| 1153 | Apparatus Integrated with Vacuum Bag |
| 1155 | Ceramic Water Filter |
| 1156 | Ensemble Ceramic Water Filters in device-integrated heat sealed vacuum bag |
| 1201 | a single water filter with the apparatus of water infiltration barrier, cylinder with channel and connecting strap installed on clean water exit port, in a vacuum-sealed bag, submerged under water with fork introducing punctures into target area |
| 1202 | a single water filter with the apparatus of water infiltration barrier, cylinder with channel and connecting strap installed on clean water exit port |
| 1203 | a single water filter with a hard plastic housing and water entry slots |
| 1204 | a single water filter with a hard plastic housing and water entry slots vacuum sealed with fork introducing punctures into target area |
| 1257 | Apparatus including Cylinder, Connector and Water Infiltration Barrier |
| 1258 | Alternative double interior wall water filter |
| 1259 | Vacuum bag surface after puncture |
| 1260 | Plastic Housed Water Filter |
| 1261 | Enclosed Housing of Plastic Housed Water Filter |
| 1262 | Target Puncture Area of Plastic Housed Water Filter |
| 1301 | assembled dual filter shippable assembly with water infiltration barriers applied to clean water exit ports |
| 1401 | assembled dual filter shippable assembly with water infiltration barriers applied to clean water exit ports submerged in the clean water capture vessel of a gravity water filter system |
| 1409 | A spigot installed in the clean water capture vessel of a gravity water filter system used to extract water from the lower chamber |
| 1411 | Rim of clean water capture chamber |
| 1501 | punctured ensemble 1001 submerged and equalizing pressure in water contained in water filter system clean water capture vessel |

| Numeral | Definition |
|---|---|
| 1601 | punctured ensemble 1001 submerged and equalizing pressure in water contained in water filter system clean water capture vessel |

FIG. 1A is a perspective view of a combined infiltration barrier, connector and water-entry apparatus 101 according to some embodiments of the present invention. In some embodiments, combined infiltration barrier, vacuum-release and water-entry apparatus 101 includes an infiltration barrier 111 connected to or integrated into a flexible connective strap 112 into which a cylinder 113 having an open side channel 114 is inserted or otherwise attached or integrated (the "device").

FIG. 1B is a perspective view of a combined infiltration barrier, connector and water-entry apparatus 102 according to some embodiments of the present invention. In some embodiments, combined infiltration barrier, vacuum-release and water-entry apparatus 102 includes an infiltration barrier 111 integrated into a flexible connective strap 112 into which a cylinder 113 having an open side channel 114 is integrated 115 (the "device").

FIG. 1C is a perspective view of a combined infiltration barrier, connector and water-entry apparatus 103 according to some embodiments of the present invention. In some embodiments, combined infiltration barrier, vacuum-release and water-entry apparatus 103 includes an infiltration barrier 111 integrated into a flexible connective strap 116 into which a cylinder 113 open on both ends 117 having a row of open holes on the side 118 is integrated (the "device").

FIG. 2 is a perspective view of a water filter 201 having a cylindrical filter portion 215 manufactured with an end cap 217 and a threaded stem outlet post 216 according to some embodiments of the present invention. In some embodiments, water filter 201 is manufactured with cylindrical filter portion 215, an end cap 217 sealed to the cylindrical filter portion 215, and a stem outlet 216 (also called exit port 216) extending from the end cap 217. In some embodiments, exit port 216 is threaded. In some embodiments, the cylindrical circumference of filter portion 215 is an unfiltered-water entry port (in some embodiments, the entry port for unfiltered water is the entire exterior surface of water filter 201 except for the portion affixed to end cap 217, but including the end opposite end cap 217).

FIG. 3 is a perspective view of assembled water filter and barrier 301 that includes water filter 201 connected to combined infiltration barrier, connector and water-entry apparatus 101 according to some embodiments of the present invention. FIG. 3 shows the infiltration barrier creates a seal over the stem outlet 111. The infiltration barrier may be form fitted or threaded to protect the filter's stem from unfiltered water 111. In some embodiments, infiltration barrier 111 is integrated with a flexible connection 112 to a capped, hollow cylinder 113 with an open channel or vent 114 terminating in a closed hollow cylinder with an open end. In some embodiments, the infiltration barrier portion of combined apparatus 101 creates a seal over the stem outlet 216 of water filter 201. The infiltration barrier may be form fitted or threaded to protect the filter's stem 216 from unfiltered water. In some embodiments, the infiltration barrier 111 is integrated with a flexible connection 112 to a hollow cylinder 113 with an open channel or vent 114 terminating in a closed hollow cylinder with an open end. In some embodiments, hollow cylinder 113 is capped.

FIG. 4 is a perspective view of assembled shippable assembly 401 that includes assembly 301 vacuum sealed in bag 416, according to some embodiments of the present invention. In some embodiments, the infiltration barrier 111 is installed on the stem outlet 216 of the dry filter 215. The dry filter, along with the now attached infiltration barrier, open channel 114 and cylinder that includes the device 113 is sealed in a vacuum bag 416 with the open channel 114 facing the outside of the bag 416. This channel 114 creates the target representing the most effective area for the end user to break the vacuum seal to initiate a rapid water infiltration process resulting from the equalization of the pressure between the interior of the bag, the filter media and the surrounding water. The stem outlet of the filter 216 is oriented toward the closed end of the vacuum sealing bag 416. The vacuum sealing bag is placed inside a chamber vacuum machine, with the open end of the bag placed over a heat sealing bar. The chamber vacuum sealer removes the air from the interior of chamber and at the end of the cycle automatically heat seals the bag, retaining the vacuum created inside the bag.

FIG. 5A is a perspective view of a method 501 during which assembled shippable assembly 401 is at least partially submersed in water 519, according to some embodiments of the present invention. In some embodiments, the assembled shippable assembly 401 including vacuum-packed filter and device 518 are submerged in water 519 sufficient to completely cover the open channel in the cylinder 520. The open channel functions as the target for the introduction of, e.g., one to four, small openings 521—such as those made by puncturing the bag with a common household dinner fork 522 or a writing pen, pin or stick—poked through the bag wall. These small punctures break the vacuum seal and act to regulate the speed with which the surrounding water enters the bag and flows through the cylinder 520 covering and infiltrating the filter media 523 (see FIG. 9E). Large holes, a greater number of holes, cuts and tears are disadvantageous and will cause the process to underperform or fail.

FIG. 5B is a perspective view of a method 502 during which assembled shippable assembly 401 is at least partially submersed in a fresh water 519 pond, lake, river or stream according to some embodiments of the present invention. In some embodiments, the assembled shippable assembly 401 including vacuum-packed filter and device 518 are submerged in water 519 sufficient to completely cover the open channel in the cylinder 520. The open channel functions as the target for the introduction of, e.g., one to four, small openings 521—such as those made by puncturing the bag with a common household dinner fork 522 or a writing pen, pin or stick—poked through the bag wall. These small punctures break the vacuum seal and act to regulate the speed with which the surrounding water enters the bag and flows through the cylinder 520 covering and infiltrating the filter media 523 (see FIG. 9E).

Figure 6C:
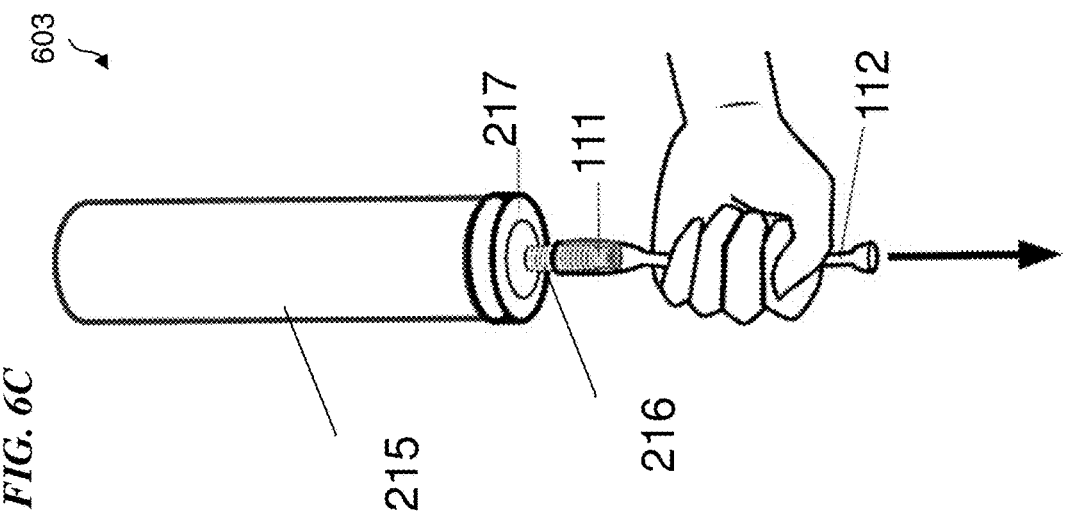
FIG. 6C is a perspective view of a method 603 during which infiltration barrier 111 is removed from the end of water-primed filter 201, according to some embodiments of the present invention.
Figure 6B:
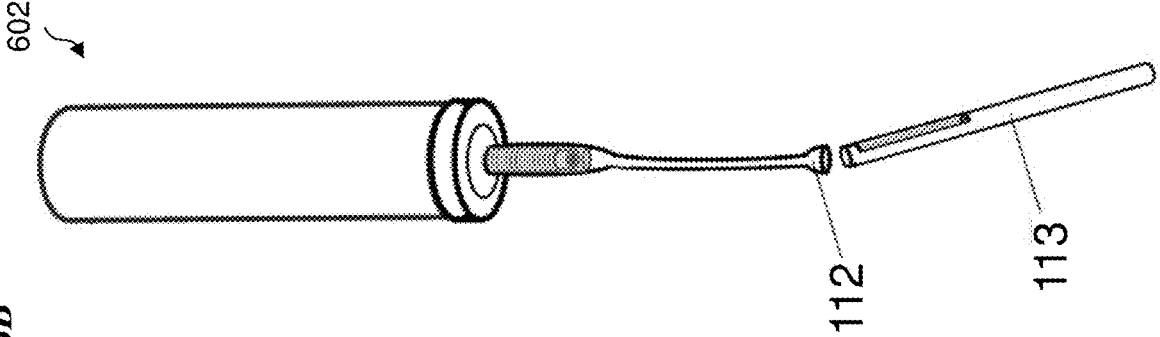
FIG. 6B is a perspective view of a method 602 during which puncture target 114 is removed from water-primed filter assembly 301, according to some embodiments of the present invention.
Figure 6A:
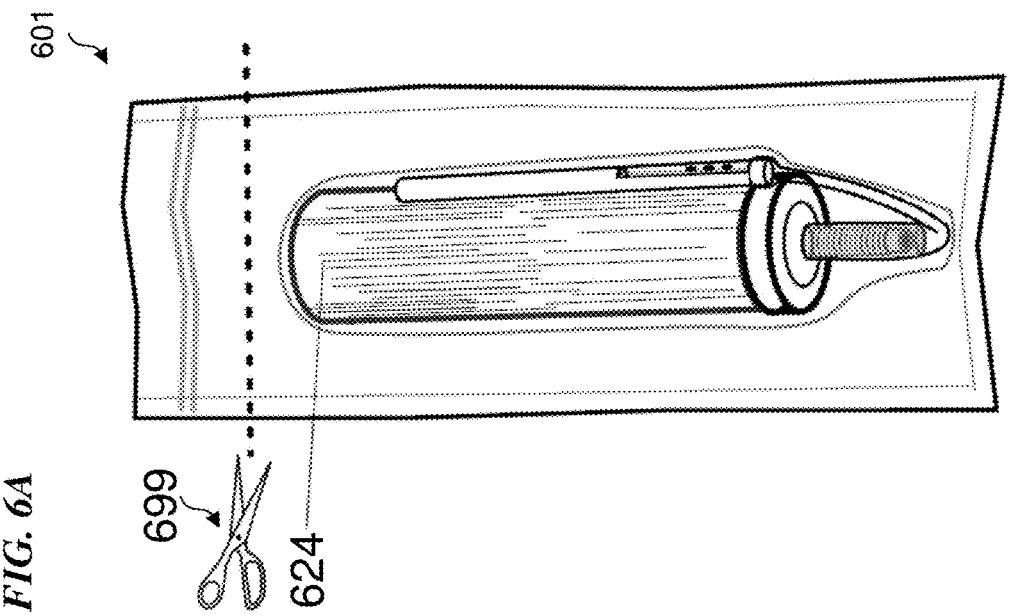
FIG. 6A is a perspective view of a method 601 during which the polymer bag 416 (of the water-infused and assembled shippable assembly 401 including water-primed filter assembly 301) is cut open using scissors 699, according to some embodiments of the present invention.

FIG. 6A is a perspective view of a method 601 during which the polymer bag 416 (of the water-infused and assembled shippable assembly 401 including water-primed filter assembly 301) is cut open using scissors 699, according to some embodiments of the present invention. When the water infiltration process is complete (usually under 30 seconds), the filter and device are removed from the bag 624.

FIG. 6B is a perspective view of a method 602 during which puncture target 114 is removed from water-primed filter assembly 301, according to some embodiments of the present invention. In some embodiments, the cylinder 113 is disconnected from the flexible connective strap 112, while in other embodiments, it is left in place (see FIGS. 1B and 1C).

FIG. 6C is a perspective view of a method 603 during which infiltration barrier 111 is removed from the end of water-primed filter 201, according to some embodiments of the present invention. In some embodiments, the strap 112 provides a convenient handle allowing the end user to more easily pull the infiltration barrier off the stem outlet 216 of the filter cap 217.

FIG. 7A is a close-up perspective view of a method 701 during which the polymer bag 416 of the now-water-infused and assembled shippable assembly 401 has been punctured and has filled with water is supported at the edges of elongated opening 114 having a C-shaped cross section 712 (in various embodiments, the C-shaped cross section is circular, ovoid, square or other suitable variations that support the bag over a void such that the puncturing tool can penetrate easily), such that a puncturing tool, such as fork 522, can readily poke one or more small holes through the bag 416, according to some embodiments of the present invention. In some embodiments, a common household dinner fork 522 is used to puncture the vacuum sealed bag in the space provided by the open channel in the cylinder 114; however, the tool is unimportant and wide variety of common items capable of producing a small, clean puncture could be used—writing pens, a pin, even a toothpick or twig. This flexibility improves the method and device's end-user success rate across a wide variety of environments and situations. A cross section view of the open channel in the hollow cylinder 113 illustrates the positioning requirement of the open face upward against the outside surface of a tightly sealed vacuum bag 416 creating the channel which permits water to enter the bag, flow through the hollow cylinder and facilitate the speedy and even infiltration of the filter 1010 without dry spots caused by bag adhesion. The open channel functions as target area in which the end user should puncture the bag; the closed back of the channel, positioned between the instrument of puncture and the filter surface 411, provides a protective layer, shielding the filter surface 411 from damage when the bag 416 is punctured 522.

FIG. 7B is a perspective view of a microporous water filter 702 having a cylindrical filter media surface 411 with direction of water infiltration 722 through a cross section of filter media 1010 manufactured with a sealed end cap 217 and a threaded stem outlet 216 (also called exit port 216) extending from the end cap 217, according to some embodiments of the present invention.

Figure 8B:
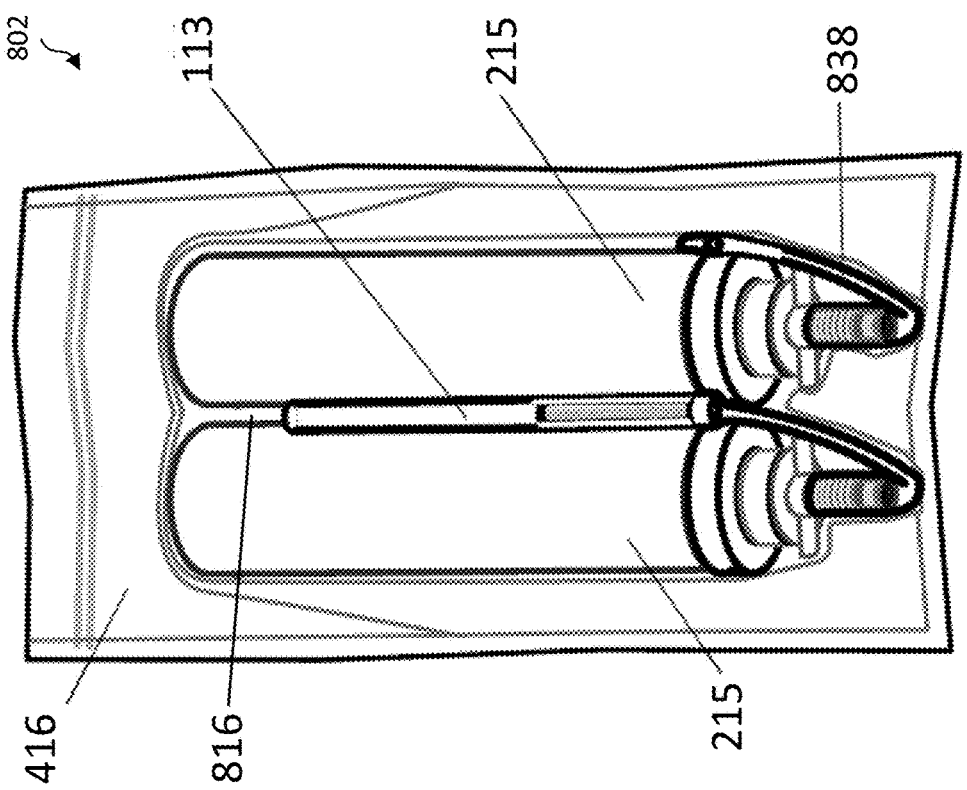
FIG. 8B is a perspective view of assembled dual-filter shippable assembly 802 that includes ensemble 801 packaged in a vacuum-sealed bag 416, according to some embodiments of the present invention.
Figure 8A:
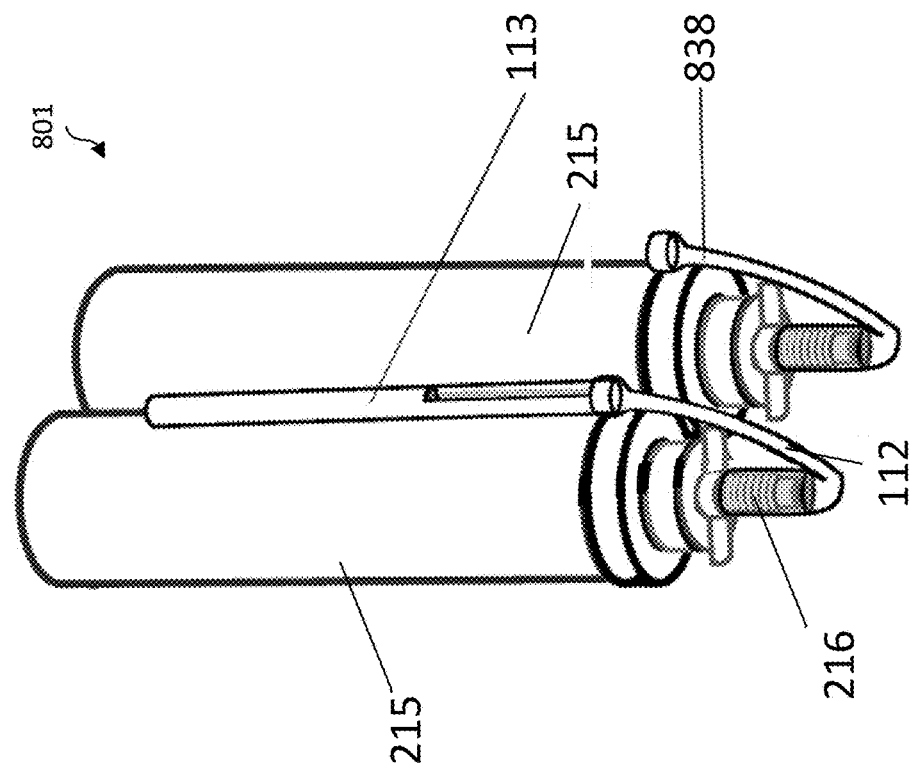
FIG. 8A is a perspective view of an ensemble 801 having a single water-entry and barrier apparatus 101 that will be used to prime two water filters, according to some embodiments of the present invention.

FIG. 8A is a perspective view of an ensemble 801 having a single water-entry apparatus 101 that will be used to prime two water filters, according to some embodiments of the present invention.

FIG. 8B is a perspective view of ensemble 801 packaged in a vacuum-sealed bag 416, according to some embodiments of the present invention. In some embodiments, a single device 101 is used to effectively hydrate two filters simultaneously in the same vacuum sealed package 802. Frequently, the filters are sold in pairs. This configuration places the device 101 connected to one filter 215 in the space between two filters 816 in a single bag 416. The second filter 215 has only the water infiltration barrier and strap 112 attached 838.

Figure 9A:
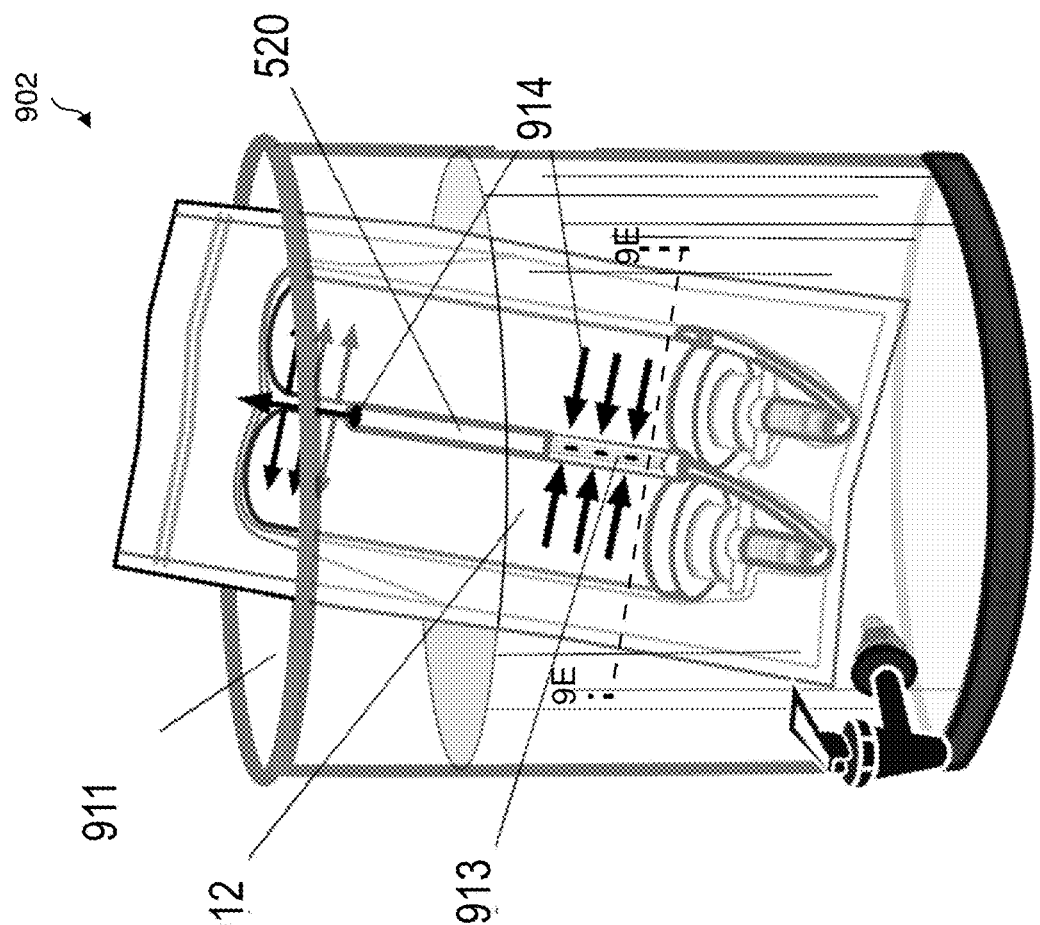
FIG. 9A is a perspective view of a method 901 during which the polymer bag 416 of assembled dual-filter shippable assembly 802 is held under water and punctured by fork 522 to leave one or more small holes, according to some embodiments of the present invention.

FIG. 9A is a perspective view of a method 901 during which the polymer bag 416 of assembled dual-filter shippable assembly 802 is held under water and punctured by fork 522 to leave one or more small holes 913, according to some embodiments of the present invention.

Figure 9B:
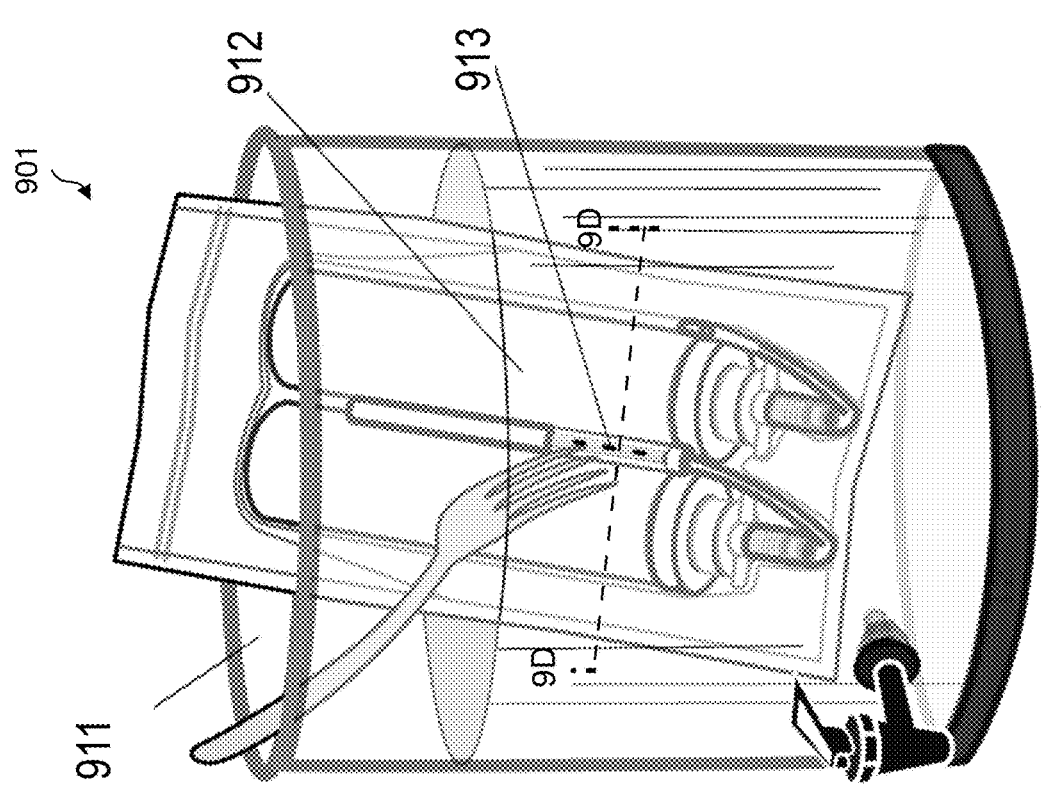
FIG. 9B is a perspective view of a method 902 during which water 519 enters at a controlled rate and then enters the water filter media 411, according to some embodiments of the present invention.

FIG. 9B is a perspective view of a method 902 during which water 914 enters at a controlled rate and then enters the microporous media of the filters 1010, according to some embodiments of the present invention. This demonstrates one possible method of using the purification or filtration systems housing 911 to submerge the filter and device in vacuum sealed package underwater 912. However, the filters need only be submerged in fresh water, regardless of circumstance. Once the rapid water infiltration process has been initiated by puncturing one to four small holes in the submerged portion of the package 913, it is essential that an unobstructed channel 520 between the two filters be present to evenly distribute water entering the package around the filter media quickly and thoroughly (complete preparation of the filter media using the method and device takes about 30 seconds). The proper placement of the device consistently creates and maintains an optimum channel facilitating effective water distribution 914. The small punctures in the target area 114 regulate the flow rate ensuring that equalization is optimal for filter preparation. Large or too numerous punctures, tears and rips will cause the filter preparation to underperform or fail. Time to complete filter preparation will vary depending on filter thickness, density and composition.

Figure 9D:
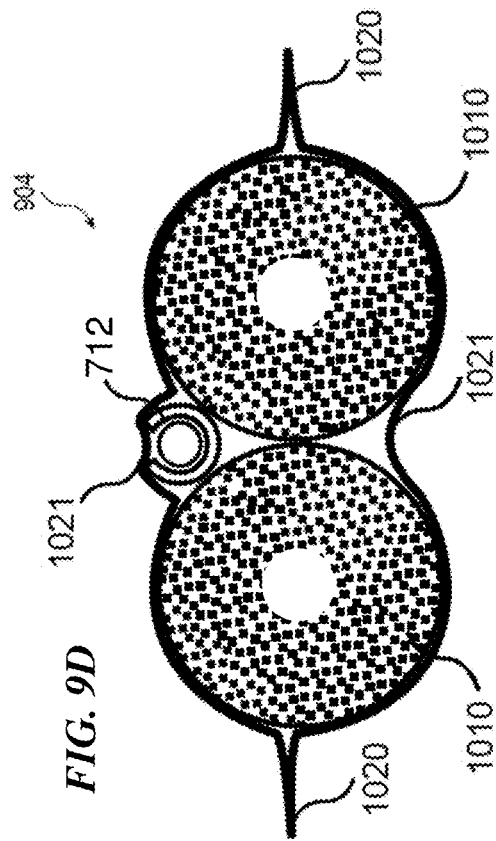
FIG. 9D is a radial cross-sectional view (along the dot-dashed line 9D of FIG. 9A) of an ensemble 901 having a single water-entry and barrier apparatus 101 that will be used to prime two water filters 904, according to some embodiments of the present invention.
Figure 9E:
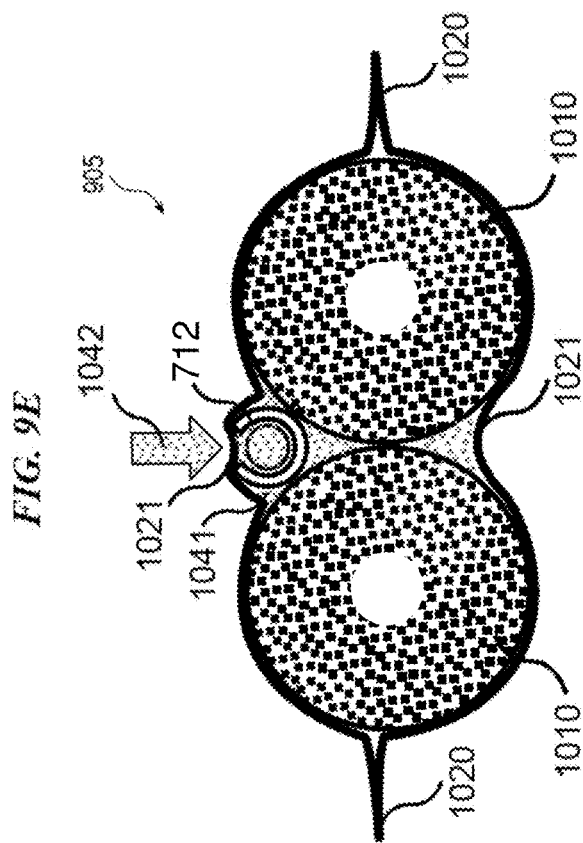
FIG. 9E is a radial cross-sectional view (along the dot-dashed line 9E of FIG. 9A) of a method 902 during which water 519 enters at a controlled rate and then enters the water filter media 1010 to prime two water filters 905, according to some embodiments of the present invention.
Figure 9C:
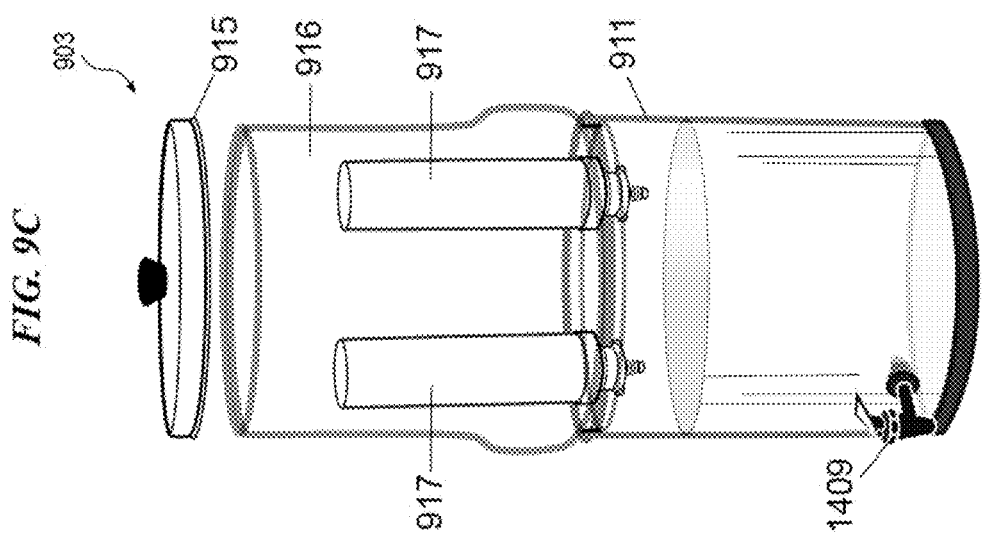
FIG. 9C is a perspective view of one example of a purification or filtration system 903, according to some embodiments of the present invention.

FIG. 9C is a perspective view of one example of a purification or filtration system that consists of a lid 915, an upper housing 916 that contains two water filters 917 installed in the upper housing 916 and the lower housing 911 with spigot 1409 used to demonstrate the submerged filters and device in vacuum sealed package underwater, according to some embodiments of the present invention.

FIG. 9D is a perspective view of shippable assembly 901 having a single water-entry and barrier apparatus 101 that will be used to prime two water filters 904, the polymer bag 1020 is supported at the edges of elongated opening 114 having a C-shaped cross section 712 where placement within the bag results in a taut vacuum bag surface 1021 above the puncture target channel 114, according to some embodiments of the present invention.

FIG. 9E is a perspective view of a method 902 during which water 519 enters at a controlled rate and then enters the water filter media 1010 to prime two water filters 905 after the vacuum bag surface 1021 has been punctured at a C-shaped cross section 712 while submerged 1042 and filled with water 1041, according to some embodiments of the present invention.

FIG. 10A is a perspective view of assembled dual-filter shippable assembly 1001 that includes two filters, each capped with a water-infiltration barrier, packaged in a vacuum-sealed bag 1045, according to some embodiments of the present invention.

FIG. 10B is a perspective view of a method 1002 during which water 519 enters at a controlled rate through holes 1050 and then enters the microporous media of the filters 1010, according to some embodiments of the present invention. In some embodiments, two dry filters 1044 are sealed in a vacuum-packed plastic bag (without the device 1045) such that the second filter acts as the device that forms the puncture target 1046 as being the space in the middle of the two filters across which the bag is stretched. The plastic bag becomes form fitted around the filters as air is removed and a vacuum created; careful filter placement within the bag results in a taut vacuum bag surface 1021 above the tapered void created between the two filters 1046 that acts as the necessary channel for water distribution. This void in the vacuum sealed bag 1011 is where the vacuum seal is most effectively broken to initiate the rapid hydration of the filtration media. The outlet ports of the filters are sealed with an infiltration barrier 1047 and the outlet ports are directed downward in the package during the priming operation. FIG. 10B demonstrates one possible method of using the purification system's housing 1048 to submerge the filters in water 1049. Small holes in the middle of the submerged void space of the bag 1050 draw the surrounding water into the bag as pressure begins to equalize and quickly infiltrates the filter media 1051 including the microporous carbon filtration media inside 1010.

FIG. 10C is a perspective view of shippable assembly 1001 that will be used to prime two water filters 1003, the polymer bag 1020 is supported at the edges where careful filter placement within the bag creates a void between the two filters and results in a taut vacuum bag surface 1021 that acts as the necessary channel for water distribution 1011, according to some embodiments of the present invention.

FIG. 10D is a perspective view of shippable assembly 1001 that will be used to prime two water filters 1004, the polymer bag 1020 is supported at the edges where careful filter placement within the bag creates a void between the two filters and results in a taut vacuum bag surface 1021 that acts as the necessary channel for water distribution 1011, water 1042 enters the void between the two filters 1041 at a controlled rate and then enters the water filter media 1010 to prime two water filters 1044 after the vacuum bag surface 1021 has been punctured, according to some embodiments of the present invention.

Figure 11C:
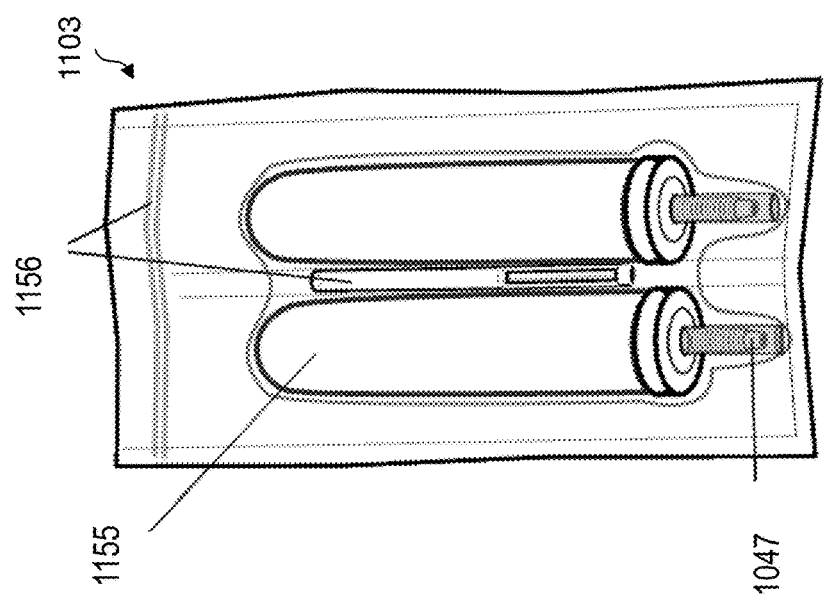
FIG. 11C is a perspective view of assembled dual-filter shippable assembly 1103 that includes ensemble 1102 packaged and sealed in vacuum-sealed bag 1101, according to some embodiments of the present invention.
Figure 11B:
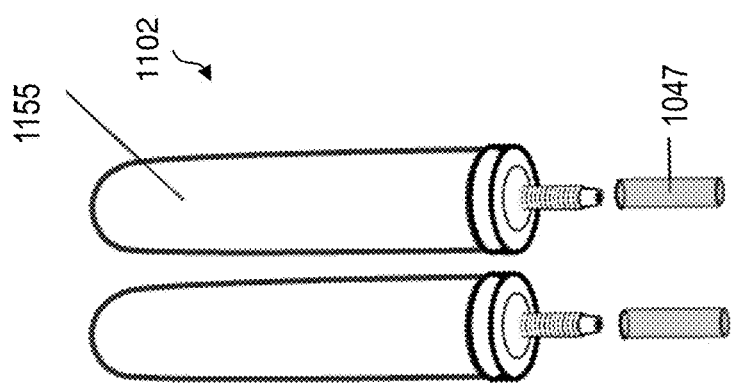
FIG. 11B is a perspective view of an ensemble 1102 having two water filters with attached water infiltration barriers 1047, according to some embodiments of the present invention.
Figure 11A:
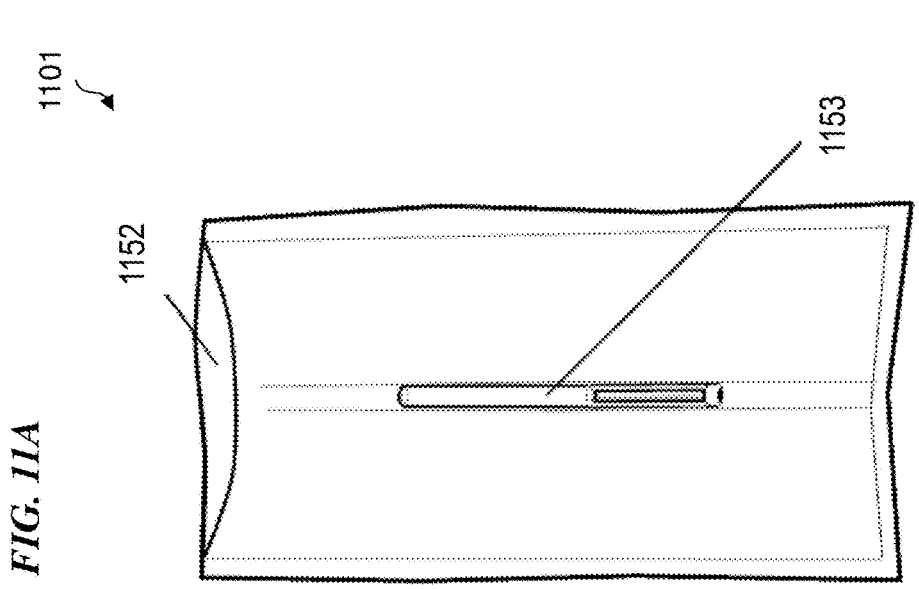
FIG. 11A is a perspective view of a combined vacuum-sealable bag and water-entry puncture-target apparatus 1101 according to some embodiments of the present invention.

FIG. 11A is a perspective view of a combined vacuum-sealable bag and water-entry puncture-target apparatus 1101 according to some embodiments of the present invention.

FIG. 11B is a perspective view of an ensemble 1102 having two capped water filters 1155, according to some embodiments of the present invention.

FIG. 11C is a perspective view of assembled dual-filter shippable assembly 1103 that includes ensemble 1102 packaged and sealed in vacuum-sealed bag 1101, according to some embodiments of the present invention. In some embodiments, the method of vacuum packaging water filters in the present invention utilizes a vacuum bag or other material which functions to contain an induced vacuum over time 1152. This method may be used with or without the device in two filter packages; however, the use of the device creates the ability to use the method with one filter, and ensures a consistent channel and protective target, increasing production quality and end-user success. An alternate packaging system could include the device as an integrated component of the vacuum bag 1153). The outlet ports of the filters are sealed with infiltration barriers 1047. In this example, ceramic multistage filtration candles 1155 are vacuum packaged in the bag with the device as an integrated component 1156.

FIG. 12A is a perspective view of a method 1201 during which assembled shippable assembly 1250 is at least partially submersed in water with another type of microporous water filter 1258. prepared with the water outlet port 216 covered by the water infiltration barrier 111 with the strap connector 112 attached to the water entry apparatus 101. The filter and the apparatus are shown sealed within the vacuum bag 416 and submerged under water 519 in preparation for puncturing the bag with a fork 522 at the puncture target channel 411, according to some embodiments of the present invention.

FIG. 12B is a perspective view of assembled water filter and barrier 1202 that includes a water filter 1258 connected to combined infiltration barrier 111, connector and water-entry apparatus 101 according to some embodiments of the present invention.

FIG. 12C is a perspective view of a gravity flow carafe filter 1203 where the filter media is enclosed in a filter housing 1261 manufactured with an end cap outlet port 1260 attached to the filter housing 1261, according to some embodiments of the present invention.

FIG. 12D is a perspective view of a method 1204 during which assembled shippable assembly 1264 is at least partially submersed in water 519 with a gravity flow carafe filter 1203 within a vacuum bag 1266 and submerged under water 519 in preparation for puncturing the bag with a fork 522 at the end cap outlet port 1260 attached to the filter housing 1261, according to some embodiments of the present invention.

Figure 13:
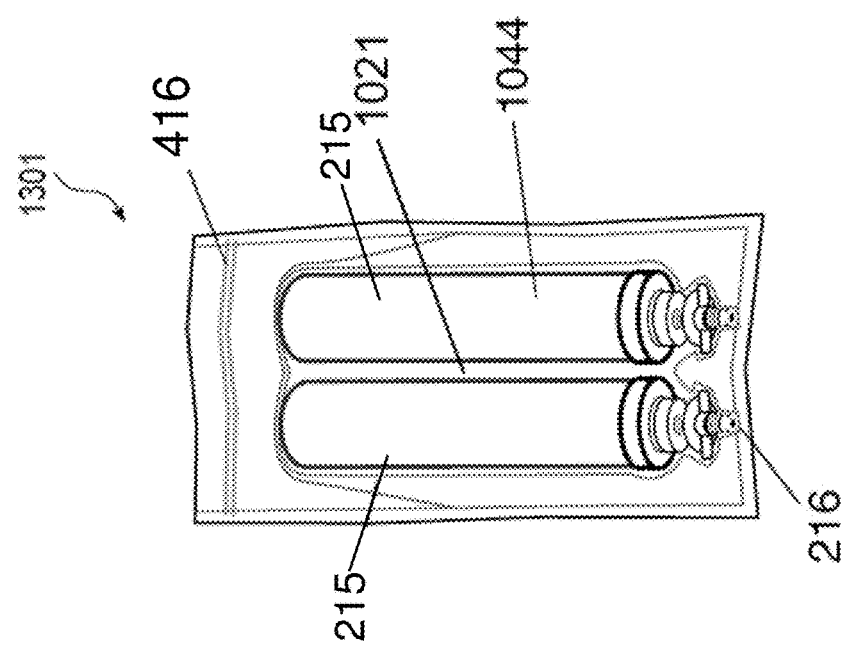
FIG. 13 is a perspective view of apparatus 1301, according to some embodiments of the present invention having an assembled dual-filter shippable assembly packaged in a vacuum-sealed bag.

FIG. 13 is a perspective view of an apparatus 1301 that includes two dry carbon microporous filter elements 215 sealed in a vacuum-packed plastic polymer bag 416. The plastic is form fitted around the filtration elements 1044, and creates a tight gap between the two elements 1021. This gap 1021 is where the vacuum seal is most effectively broken to initiate the priming process. The outlets of the filter elements 216 face downward in the package, according to some embodiments of the present invention.

Figure 14:
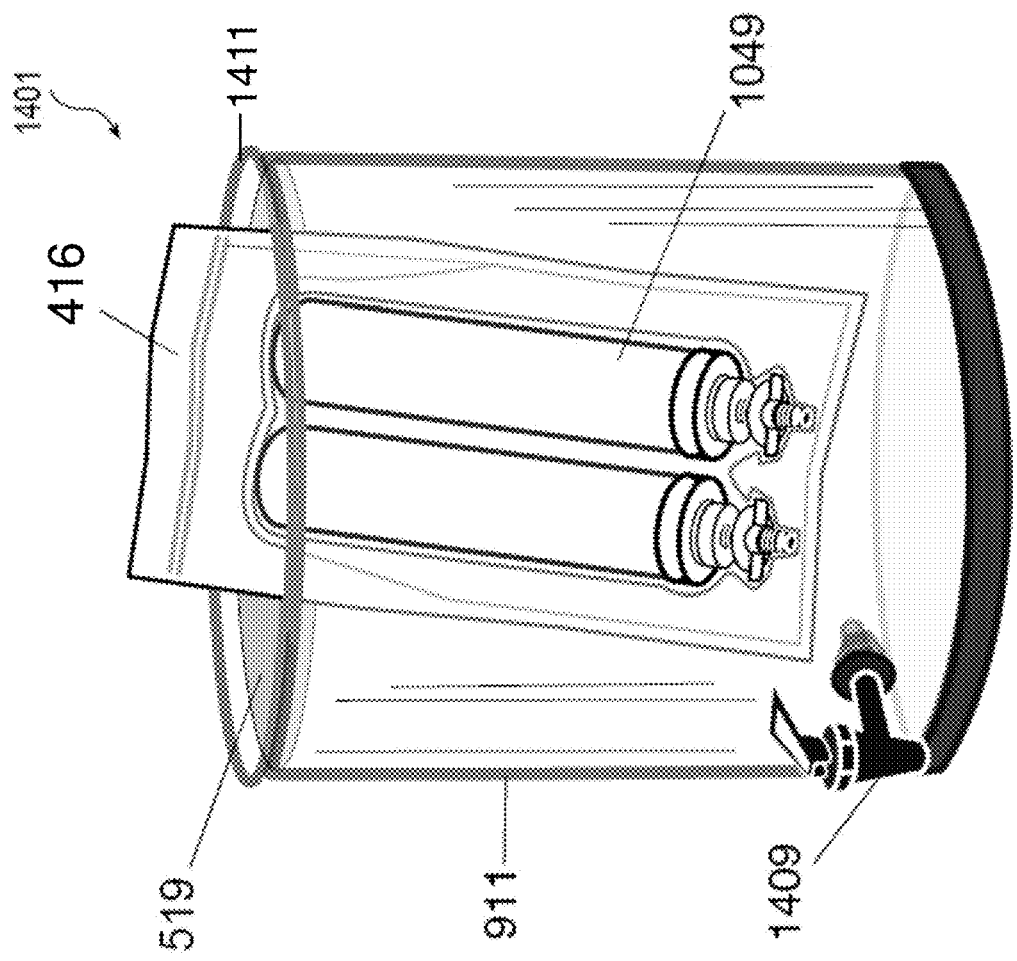
FIG. 14 is a perspective view of apparatus 1401, according to some embodiments of the present invention having an assembled dual-filer shippable assembly packaged in a vacuum-sealed bag 416 held under water using the purification systems housing 911 to submerge the filters in water 519.

FIG. 14 is a perspective view of apparatus 1401, according to some embodiments of the present invention. FIG. 14 demonstrates one possible method of using the purification systems housing 911 to submerge the filters in water 519. However, the filters need only be submerged in fresh water, regardless of circumstance. The spigot on the lower chamber 1409 can be used to drain the water in the event that water displaced from the submerged filter package 1049 threatens to overflow the rim of the chamber 1411.

Figure 15:
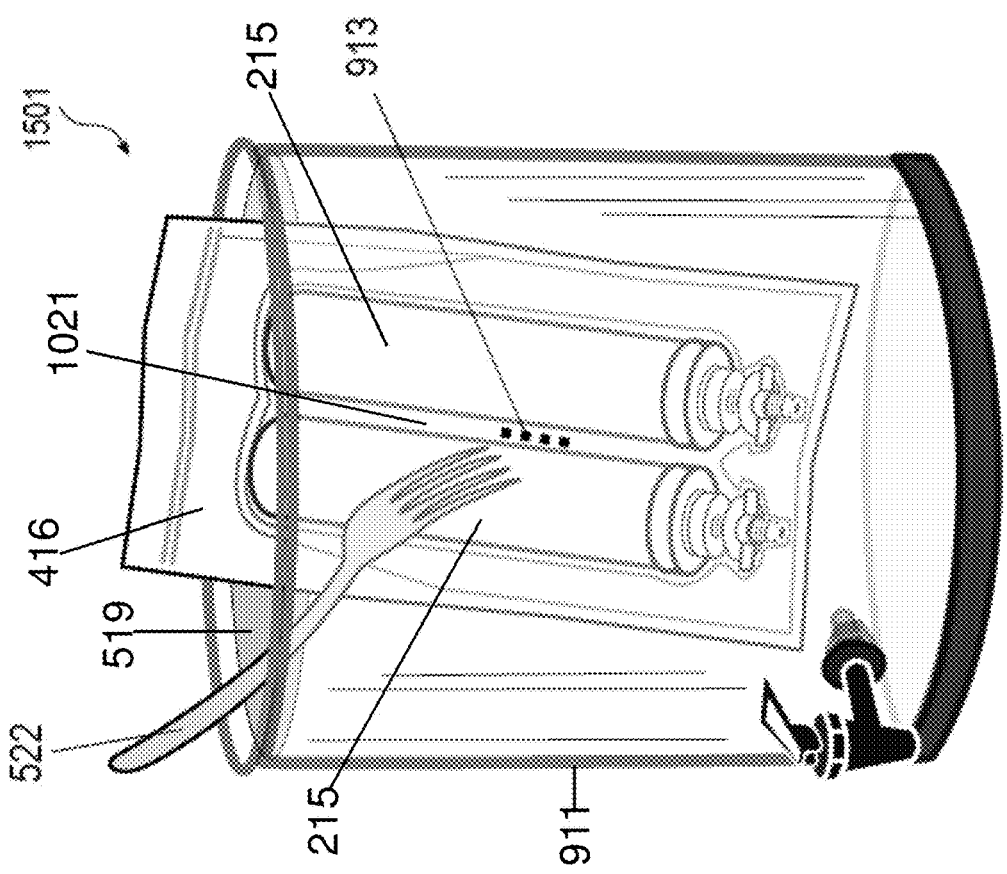
FIG. 15 is a perspective view of apparatus 1501, according to some embodiments of the present invention having an assembled dual-filter shippable assembly packaged in a vacuum sealed bag 416 held under water using the purification systems housing 911 to submerge the filters in water 519 and punctured by fork 522 to leave one or more small holes 913 in the target area provided by the tight gap 1021 created by the form fitted plastic between the two elements 215 during vacuum packaging.

FIG. 15 is a perspective view of apparatus 1501, according to some embodiments of the present invention having an assembled dual-filter shippable assembly packaged in a vacuum sealed bag 416 and held under water using the purification systems housing 911 to submerge the filters in water 519 and punctured by fork 522 to leave one or more small holes 913 in the tight gap target area created by careful filter placement 1021 between the two elements 215 during vacuum packaging. A wide variety of common items could be used-writing pens, scissor tips, even a toothpick or twig to puncture the vacuum sealed bag 913 in the space between the two filters 1021.

Figure 16:
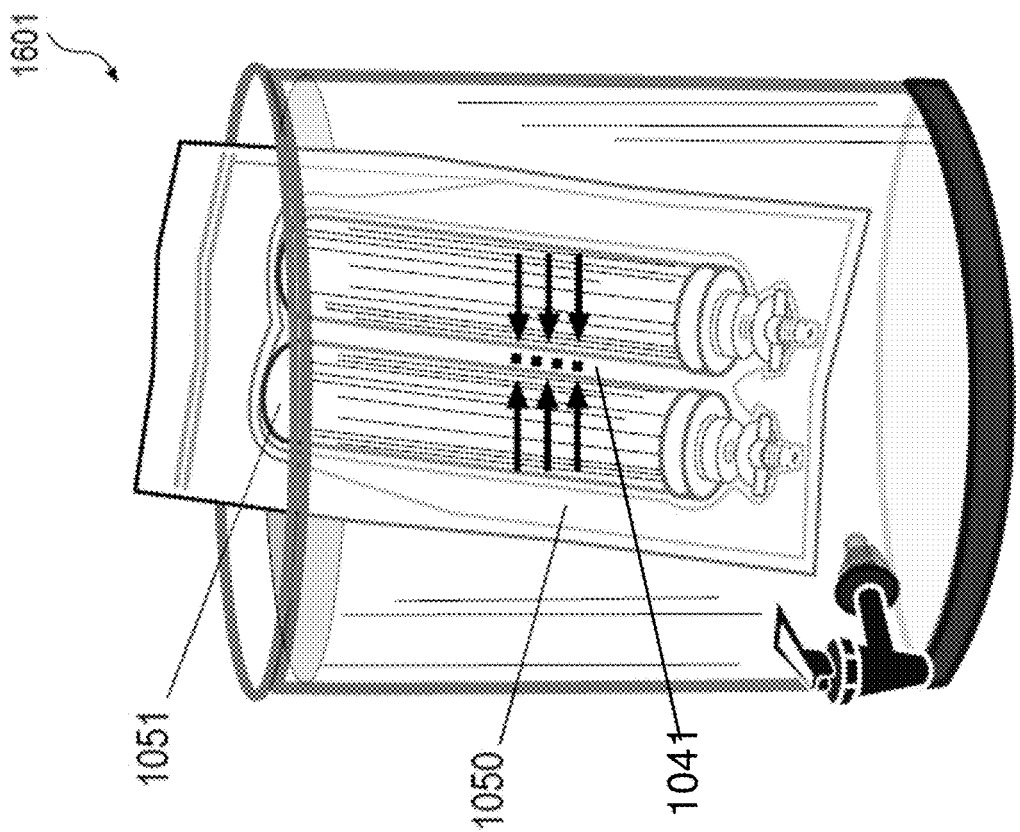
FIG. 16 is a perspective view of apparatus 1601, according to some embodiments of the present invention demonstrating water 1050 flowing into the punctures 1041 created by fork 522.

FIG. 16 is a perspective view of apparatus 1601, according to some embodiments of the present invention. Small holes in the middle of the submerged bag 913 suck the surrounding water into the bag 1050. As pressure begins to slowly equalize the water enters the bag 1041 and is quickly absorbed by the microporous carbon filtration media 1051. vacuum created inside the bag.

A method and system for water-priming carbon micropore filter media using negative pressure is described. The filters include carbon with micro-pores <0.1 microns in diameter. The method includes placing dry filter elements in a polymer bag, applying a vacuum of approximately −0.1 MPa or −29.5 inHg, and heat-sealing the bag using a heat-set bar; submerging, by a consumer, the vacuum-sealed bag with its the filter elements in water; the filters in the vacuum sealed bag are at least partially submerged, puncturing the bag to form one or more small openings in the bag—such as those made by a common dinner fork, pen tip or even a stick. Breeching the vacuum causes the water to flow through the openings into the bag and filters to equalize the pressure between the water and the previously negative-pressure environment in the plastic bag. The surrounding water relatively quickly (as controlled by the size of the bag puncture holes and/or flow restrictions in device 101) flows into the micro-pores of the filter media, priming the filter for use in a gravity-fed water-purification system.

In some embodiments, the present invention provides an apparatus configured to prime a water filter. This apparatus includes: a first water filter that includes an unfiltered-water inlet surface and a filtered-water exit port; a first removable exit-port water-infiltration barrier fitted to seal the exit port of the first water filter; a first bag-puncture-facilitation device; a vacuum-sealed bag, wherein the bag includes a polymer, wherein the first water filter, the first water-infiltration barrier fitted to seal the output port of the first water filter, and the bag-puncture-facilitation device are contained within the vacuum-sealed bag, and wherein the vacuum-sealed bag has a gas pressure inside of no more than about 33 kPa above absolute zero pressure.

In some embodiments, the first bag-puncture-facilitation device includes a hollow elongated generally cylindrical structure that has an elongated opening along at least a portion of a long side and at least one open end in fluid communication with the elongated opening.

In some embodiments, the first bag-puncture-facilitation device includes a generally cylindrical structure that has an elongated opening along a length of a side defining a C-shaped cross-section and at least one open end in fluid communication with the elongated opening, wherein the first water-infiltration barrier is connected to the cylindrical structure by a flexible elongated connector.

In some embodiments, the first bag-puncture-facilitation device includes an elongated structure that has a generally C-shaped cross section for at least a 2.5-cm long portion of its length.

In some embodiments, the first bag-puncture-facilitation device includes: a second water filter that includes an inlet surface and an output port; and a second removable output-port water-infiltration barrier fitted to seal the output port of the first second filter, wherein the first water filter and the second water filter are positioned side-by-side in the bag such that a portion of the bag remains stretched across a space between the first water filter and the second water filter.

Some embodiments further include a second water filter that includes an inlet surface and an output port; a second removable output-port water-infiltration barrier fitted to seal the output port of the first second filter, wherein the first water filter and the second water filter are positioned side-by-side in the bag; and a second bag-puncture-facilitation device, wherein the first and second bag-puncture-facilitation devices each include: a generally hollow cylindrical structure that has an elongated opening along a length of a side and at least one open end in fluid communication with the elongated opening, wherein the first and second removable output-port water-infiltration barriers are each connected to respective ones of the generally hollow cylindrical structures by a respective flexible elongated connector.

In some embodiments, the vacuum-sealed bag has a gas pressure inside of no more than about 5 kPa above absolute zero pressure.

In some embodiments, the vacuum-sealed bag has a gas pressure inside of no more than about 2 kPa above absolute zero pressure.

In some embodiments, the first bag-puncture-facilitation device includes an elongated structure that has a cross-section having a convex outer surface and a concave inner surface, wherein the first water-infiltration barrier is connected to the elongated structure by a flexible elongated connector.

In some embodiments, the bag includes a laminated film having a plurality of laminated layers including at least one layer that includes nylon and another layer that includes polyolefin or polyester.

In some embodiments, the present invention provides method for preparing a water filter for use. This method includes: providing a first water filter that has an unfiltered-water inlet port and a clean-water exit port and a first water-infiltration barrier covering the clean-water exit port of the first water filter; providing a first elongated hollow device having a rounded outer surface that has at least one concave puncture-target area along a side of the hollow device in fluid communication with an open end of the hollow device; placing the first elongated hollow device and the first water filter in a dry state in a bag, wherein the bag includes a polymer; reducing air pressure in the bag to no more than 33 kPa above absolute zero pressure; and heat sealing the bag to maintain the reduced air pressure in the bag at no more than 33 kPa above absolute zero pressure.

Some embodiments further include submersing at least a portion of the sealed bag in water such that water covers the at least one open-channel puncture-target area of the hollow device; and puncturing the bag at the puncture-target area.

Some embodiments further include pasteurizing the first water filter and the first elongated hollow device together inside the sealed bag.

Some embodiments further include shipping the first water filter and the first elongated hollow cylinder together inside the sealed bag to an end user with instructions for submersing at least a portion of the sealed bag in water such that water covers the at least one open-channel puncture-target area of the hollow device and puncturing the bag at the puncture-target area.

Some embodiments further include providing a second water filter that includes an inlet surface and an output port; providing a second removable output-port water-infiltration barrier fitted to seal the output port of the first second filter; and positioning the first water filter and the second water filter side-by-side in the bag such that after the reducing of the air pressure in the bag to no more than 33 kPa above absolute zero pressure, and heat sealing the bag, a portion of the bag remains stretched across a space between the first water filter and the second water filter.

Some embodiments further include providing a second water filter that includes an inlet surface and an output port; providing a second removable output-port water-infiltration barrier fitted to seal the output port of the first second filter, wherein the first water filter and the second water filter are positioned side-by-side in the bag; and providing a second bag-puncture-facilitation device, wherein the first and second bag-puncture-facilitation devices each include: a generally hollow generally cylindrical structure that has an elongated opening along a length of a side and at least one open end in fluid communication with the elongated opening, wherein the first and second removable output-port water-infiltration barriers are each connected to respective ones of the generally cylindrical structures by a respective flexible elongated connector.

In some embodiments, the reducing of the air pressure in the bag reduces the gas pressure inside to no more than about 5 kPa above absolute zero pressure.

In some embodiments, the reducing of the air pressure in the bag reduces the gas pressure inside to no more than about 2 kPa above absolute zero pressure.

In some embodiments, the first bag-puncture-facilitation device includes: an elongated structure that has a cross-section having a convex outer surface and a concave inner surface, wherein the first water-infiltration barrier is connected to the elongated structure by a flexible elongated connector.

In some embodiments, the bag includes a laminated film having a plurality of laminated layers including at least one layer that includes nylon and another layer that includes polyolefin or polyester.

In some embodiments, the first bag-puncture-facilitation device includes: a generally cylindrical structure that has an elongated opening along a length of a side defining a C-shaped cross-section and at least one open end in fluid communication with the elongated opening, wherein the first water-infiltration barrier is connected to the cylindrical structure by a flexible elongated connector.

In some embodiments, the first bag-puncture-facilitation device includes: providing a hollow elongated generally cylindrical structure that has an elongated opening along at least a portion of a long side and at least one open end in fluid communication with the elongated opening.

In some embodiments, the first bag-puncture-facilitation device includes an elongated structure that has a generally C-shaped cross section for at least a 2.5-cm long portion of its length.

In some embodiments, the present invention provides a method of using an appropriately sized vacuum sealable bag or other containment media capable of holding the dry water filter and disclosed device and utilizing a chamber vacuum sealing device to remove air from the package and contents and retain the vacuum inside the containment media. Additionally, the containment media must be capable of being punctured or otherwise breached in a method consistent with the regulating of water infiltration to maximize filter preparation and submerged under water.

In some embodiments, the present invention provides a method of submerging the vacuum sealed media in fresh water to provide for the efficient introduction of water to the filter media preparing it for use.

In some embodiments, the present invention provides a method of using puncture holes in vacuum containment media to allow water to be introduced to the filter media.

In some embodiments, the present invention provides a device that functions as a standalone infiltration barrier for use in multiple filter packaging applications in conjunction with another integrated or connected device that incorporates the infiltration barrier and the contiguous or attached hollow cylinder featuring an open channel target area with an open end.

In some embodiments, the present invention provides a device that functions as a vacuum containment system integrating the device comprising a hollow cylinder featuring an open channel concave target area with an open end integrated into the containment system outer wall.

In some embodiments, the present invention provides a kit for making an apparatus configured to prime a water filter, the kit including: a first water filter that includes an unfiltered-water inlet surface and a filtered-water exit port; a first removable exit-port water-infiltration barrier fitted to seal the exit port of the first water filter; a first bag-puncture-facilitation device; and a heat-sealable bag sized to contain the first water filter, the first water-infiltration barrier fitted to seal the output port of the first water filter, and the bag-puncture-facilitation device within the heat-sealable bag. In some embodiments, the heat-sealable bag has a shore A durometer of at least 80, in order to form a bridge across the puncture target, rather than conforming tightly to a concave surface of the puncture target. In some embodiments, the first bag-puncture-facilitation device is fused to an inside surface of the heat-sealable bag.

In some embodiments of the kit, the first bag-puncture-facilitation device includes: a second water filter that includes an inlet surface and an output port; and a second removable output-port water-infiltration barrier fitted to seal the output port of the first second filter, such that when the first water filter and the second water filter are positioned side-by-side in the bag, and the bag is sealed with a gas pressure inside of no more than about 33 kPa above absolute zero pressure and the sealed bag is exposed to atmospheric pressure, a portion of the bag remains stretched across a space between the first water filter and the second water filter.

In some embodiments of the kit, the first bag-puncture-facilitation device includes an elongated structure that has a cross-section having a convex outer surface and a concave inner surface, wherein the first water-infiltration barrier is connected to the elongated structure by a flexible elongated connector, and the kit further includes: a second water filter that includes an inlet surface and an output port; and a second removable output-port water-infiltration barrier fitted to seal the output port of the first second filter, such that when the first water filter and the second water filter are positioned side-by-side in the bag, and the bag is sealed with a gas pressure inside of no more than about 33 kPa above absolute zero pressure and the sealed bag is exposed to atmospheric pressure, a portion of the bag remains stretched across a space between the first water filter and the second water filter.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," " "second," and "third," etc., are used merely as labels, and are not intended to impose numerical requirements on their objects.

What is claimed is:

1. An apparatus for priming a water filter, the apparatus comprising:
   a first water filter that includes an unfiltered-water inlet and a filtered-water exit port;
   a first removable exit-port water-infiltration barrier fitted to seal the exit port of the first water filter;
   a first bag-puncture-facilitation device, wherein the first bag-puncture-facilitation device includes a first hollow elongated generally cylindrical structure that has an elongated opening in at least a portion of a long side and at least one open end in fluid communication with the elongated opening; and
   a vacuum-sealed polymeric bag, wherein the first water filter, the first water-infiltration barrier fitted to seal the output port of the first water filter, and the bag-puncture-facilitation device are contained within the vacuum-sealed bag, and wherein the vacuum-sealed bag has a gas pressure inside of no more than about 33 kPa above absolute zero pressure.

2. The apparatus of claim 1, wherein the first cylindrical structure has a C-shaped cross section at the elongated opening, and wherein the first water-infiltration barrier is connected to the cylindrical structure by a flexible elongated connector.

3. The apparatus of claim 1, wherein the first cylindrical structure has a generally C-shaped cross section at the elongated opening, and the elongated opening is at least 2.5-cm long.

4. The apparatus of claim 1, wherein the first bag-puncture-facilitation device includes:
   a second water filter that includes an unfiltered-water inlet and an output port; and
   a second removable output-port water-infiltration barrier fitted to seal the output port of the second filter, wherein the first water filter and the second water filter are positioned side-by-side in the bag such that a portion of the bag remains stretched across a space between the first water filter and the second water filter.

5. The apparatus of claim 1, further comprising:
   a second water filter that includes an unfiltered-water inlet and an output port;
   a second removable output-port water-infiltration barrier fitted to seal the output port of the second filter, wherein the first water filter and the second water filter are positioned side-by-side in the bag; and
   a second bag-puncture-facilitation device, wherein the second bag-puncture-facilitation device includes a second hollow elongated generally cylindrical structure that has an elongated opening in a length of a side and at least one open end in fluid communication with the elongated opening, wherein the first and second removable output-port water-infiltration barriers are each connected to respective ones of the first and second cylindrical structures by a respective flexible elongated connector.

6. The apparatus of claim 1, further comprising:
   a second water filter that includes an unfiltered-water inlet and an output port;
   a second removable exit-port water-infiltration barrier fitted to seal the exit port of the second filter, wherein the first water filter and the second water filter are positioned side-by-side in the bag, and wherein the first removable exit-port water-infiltration barrier is connected to the first cylindrical structure by a flexible elongated connector.

7. The apparatus of claim 1, wherein the first bag-puncture-facilitation device is fused to an inside surface of the vacuum-sealed bag.

8. The apparatus of claim 1, wherein the first cylindrical structure has a cross-section at the elongated opening having a convex outer surface and a concave inner surface, wherein the first water-infiltration barrier is connected to the first cylindrical structure by a flexible elongated connector.

9. The apparatus of claim 1, wherein the bag includes a laminated film having a plurality of laminated layers including at least one layer that includes nylon and another layer that includes polyolefin or polyester.

10. The apparatus of claim 1, wherein the vacuum-sealed bag has a gas pressure inside of no more than about 2 kPa above absolute zero pressure.

11. The apparatus of claim 1, wherein the first water filter and the first bag-puncture-facilitation device are packaged to be shipped together inside the vacuum-sealed bag to an end user with instructions for the user to submerge at least a portion of the vacuum-sealed bag in water such that water covers the elongated opening of the first cylindrical structure.

12. The apparatus of claim 1, further comprising:
   a second water filter.

13. A kit for making an apparatus for priming a water filter, the kit comprising:
   a first water filter that includes an unfiltered-water inlet end and a filtered-water exit port;
   a first removable exit-port water-infiltration barrier fitted to seal the exit port of the first water filter;
   a first bag-puncture-facilitation device, wherein the first bag-puncture-facilitation device includes a first hollow elongated generally cylindrical structure that has an elongated opening in at least a portion of a long side and at least one open end in fluid communication with the elongated opening; and
   a heat-sealable bag sized to contain the first water filter, the first water-infiltration barrier fitted to seal the output port of the first water filter, and the first bag-puncture-facilitation device within the heat-sealable bag, wherein the heat-sealable bag has a shore A durometer of at least 80.

14. The kit of claim 13, further comprising:
   a second water filter that includes an inlet end and an output port; and
   a second removable output-port water-infiltration barrier fitted to seal the output port of the second filter, such that when the first water filter and the second water filter are positioned side-by-side in the bag, and the bag is sealed with a gas pressure inside of no more than about 15 kPa above absolute zero pressure and the sealed bag is exposed to atmospheric pressure, a portion of the bag remains stretched across a space between the first water filter and the second water filter.

15. The kit of claim 13, wherein the first bag-puncture-facilitation device is fused to an inside surface of the heat-sealable bag.

16. The kit of claim 13, wherein the first cylindrical structure has a cross-section at the elongated opening having a convex outer surface and a concave inner surface, wherein the first water-infiltration barrier is connected to the first cylindrical structure by a flexible elongated connector, the kit further comprising:
   a second water filter that includes an inlet and an output port; and
   a second removable output-port water-infiltration barrier fitted to seal the output port of the second filter, such that when the first water filter and the second water filter are positioned side-by-side in the bag, and the bag is sealed with a gas pressure inside of no more than about 33 kPa above absolute zero pressure and the sealed bag is exposed to atmospheric pressure, a portion of the bag remains stretched across a space between the first water filter and the second water filter.

17. The kit of claim 13, wherein the first water filter and the first bag-puncture-facilitation device are packaged to be shipped together inside the heat-sealable bag to an end user with instructions for the user to submerge at least a portion of the heat-sealable bag in water such that water covers the elongated opening of the first cylindrical structure.

* * * * *